Oct. 6, 1936.　　　　　E. DAVIS　　　　　2,056,833
AUTOMATIC DRIVE AND WASHER
Filed Oct. 12, 1935　　　5 Sheets-Sheet 1

INVENTOR
ERNEST DAVIS
BY
Bohleber + Ledbetter
ATTORNEYS

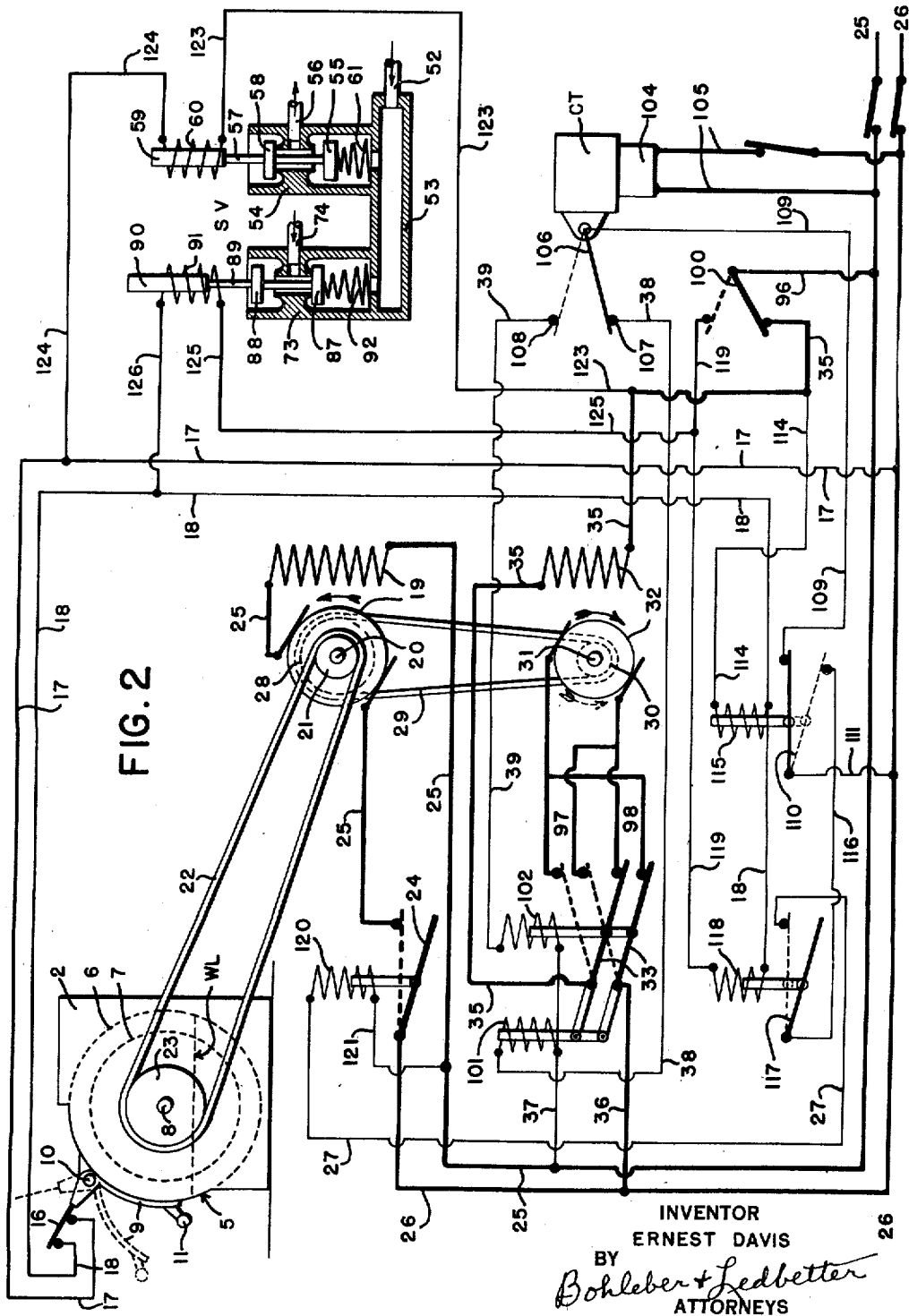

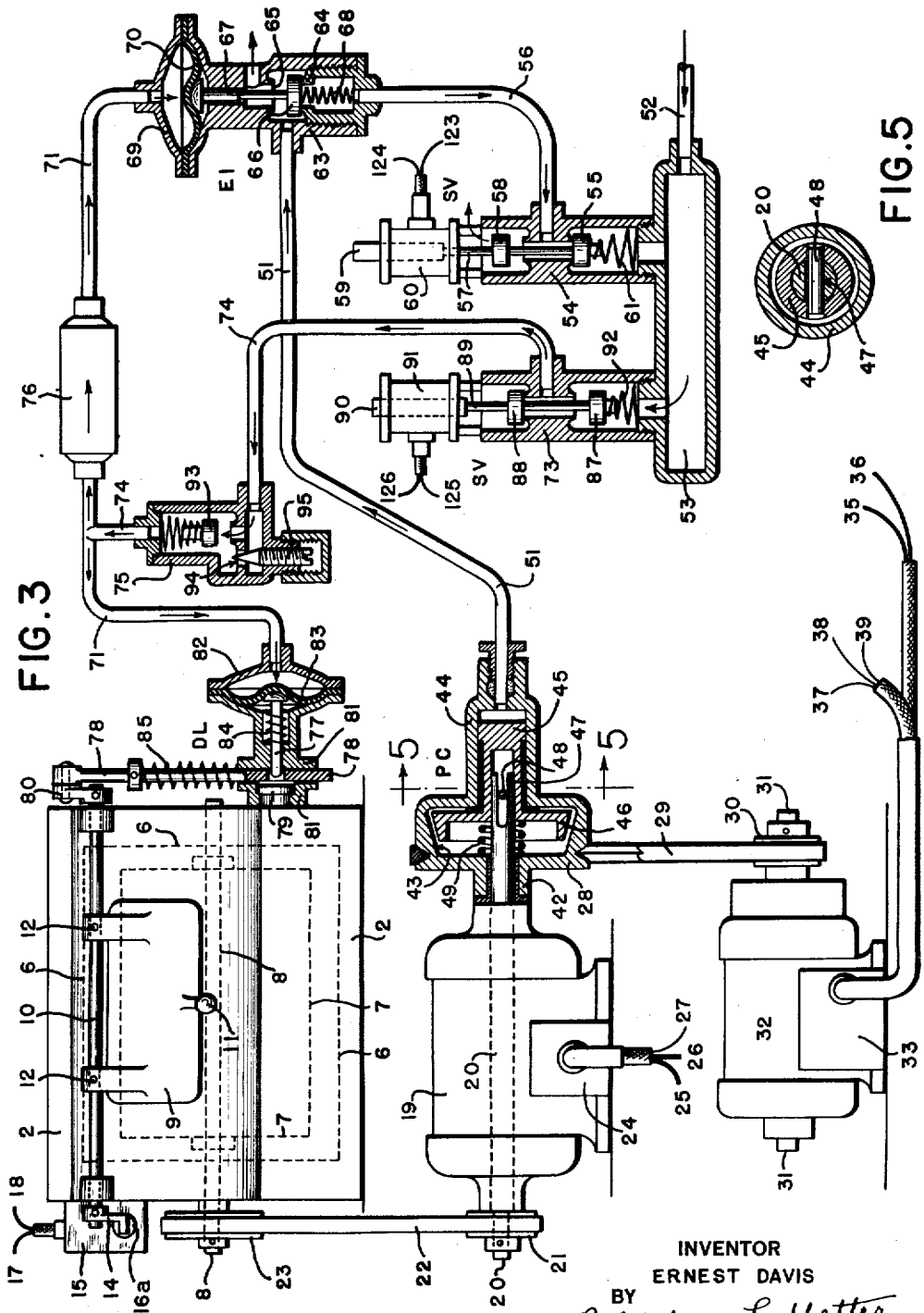

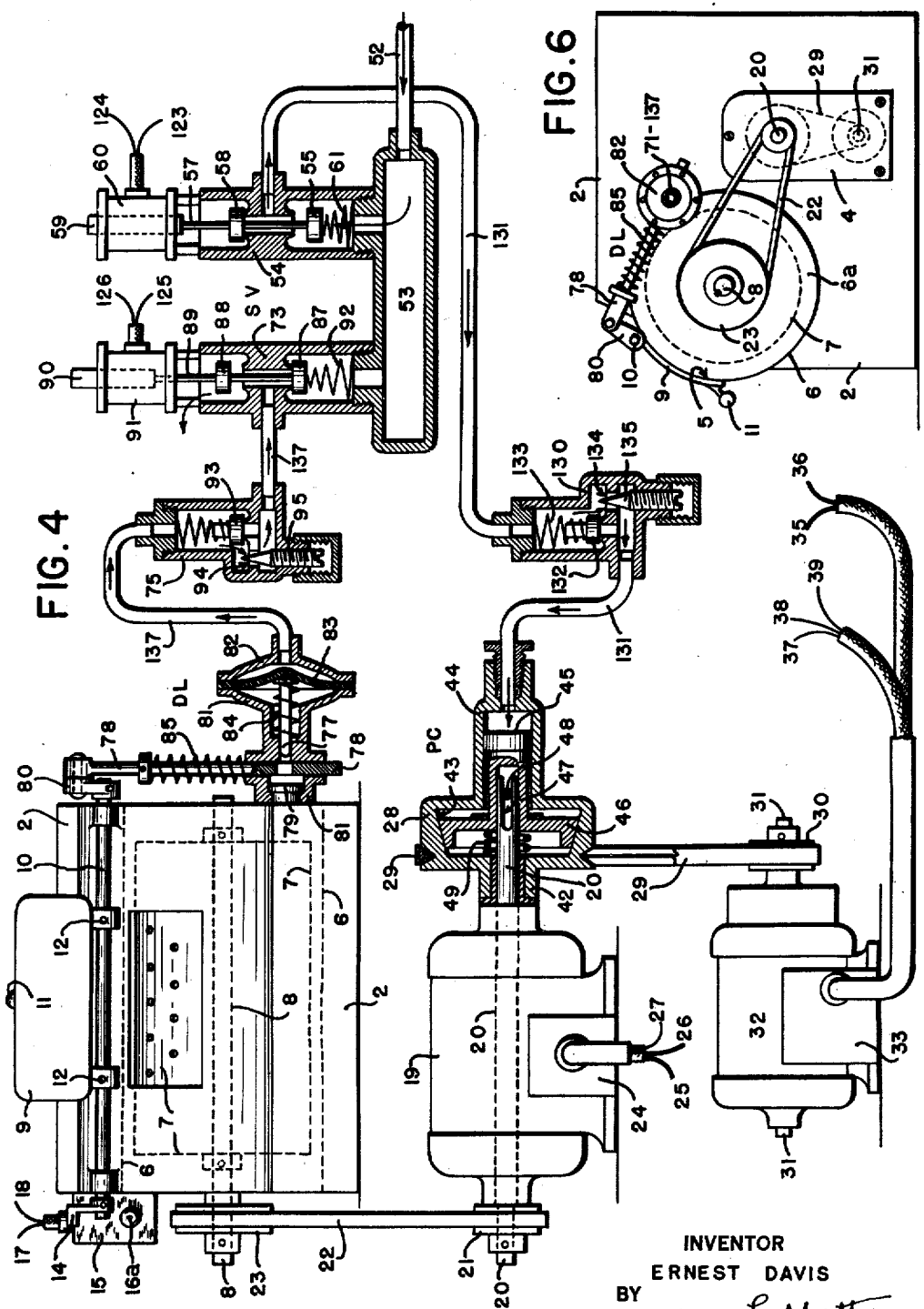

Oct. 6, 1936.   E. DAVIS   2,056,833
AUTOMATIC DRIVE AND WASHER
Filed Oct. 12, 1935   5 Sheets-Sheet 5
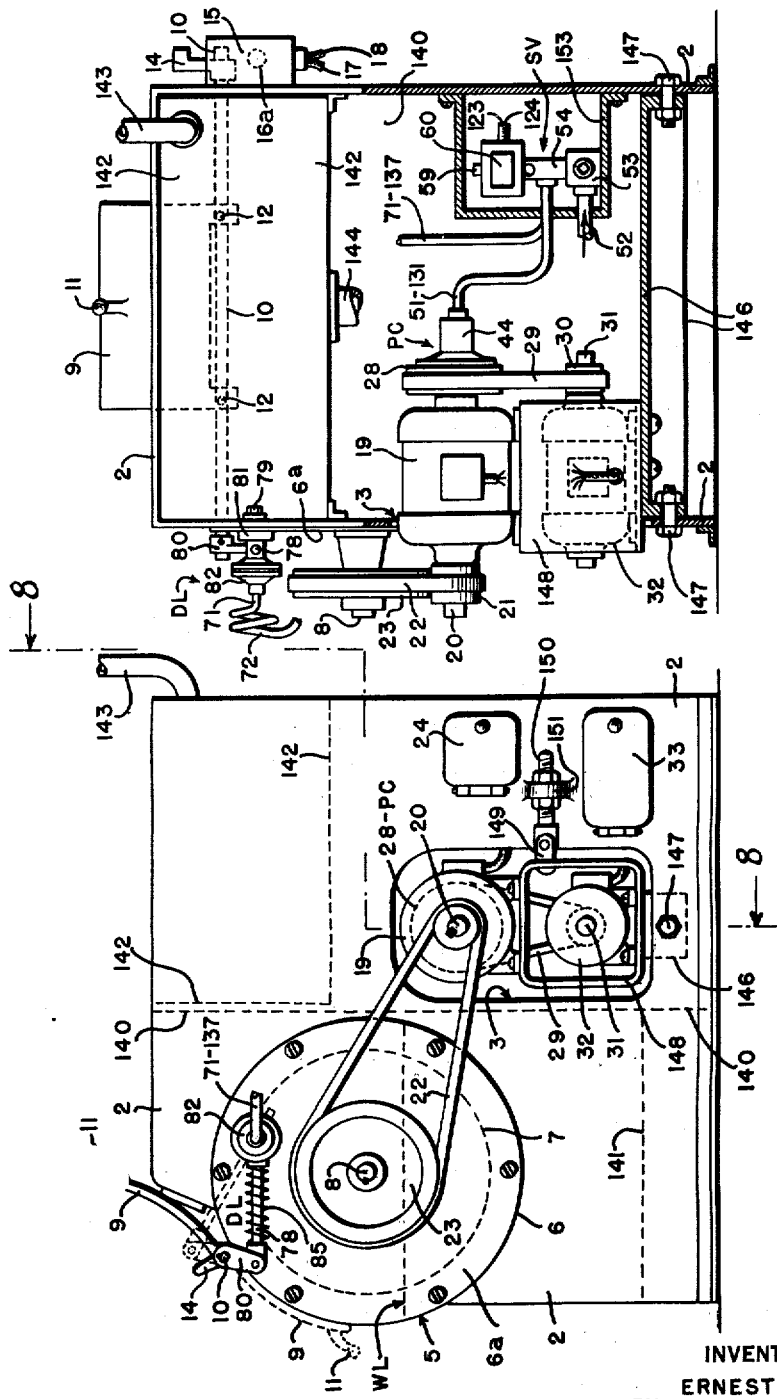
INVENTOR
ERNEST DAVIS
BY
Bohleber + Ledbetter
ATTORNEYS Patented Oct. 6, 1936

2,056,833

UNITED STATES PATENT OFFICE 2,056,833

AUTOMATIC DRIVE AND WASHER

Ernest Davis, Syracuse, N. Y., assignor to The Prosperity Company, Inc., Syracuse, N. Y., a corporation of New York Application October 12, 1935, Serial No. 44,653
In Great Britain May 2, 1934

40 Claims. (Cl. 68—18)

This invention relates to new and useful automatic power-driven machinery and a new and useful change-speed motor means for operating a driven member, such as a shaft or other element, where it is required to periodically reverse the motion of said member from time to time, and then steadily drive it in one direction, as for example in the case of washing machines, dry cleaners, tumblers, extractors, cylinders, etc., and other laundry machinery or the like. More particularly, the invention pertains to a new and useful automatic drive and washer.

An important object of the invention is to produce a new combination in a washing-machine cabinet and automatic motor means, each of which is suitably adapted to the other, wherein the driving motors and driven machine have their several axes of rotation grouped in a single cabinet of new form making for compactness, accessibility, and simplification in the power or driving transmission connected at one point on the machine or washer from my new motor means having a reversibly low-speed and a one-direction high-speed driving function.

One of the objects of the invention is to produce a full-automatic power-driving mechanism embodying one or more electric motors, together with an electro-pneumatic control mechanism therefor, capable of alternately starting, stopping, and reversing the motor or motors, together with safety means to render the machine fool-proof and insure against misoperation throughout its several automatic steps or cycles.

Among others, it is a purpose to provide, in an electric power mechanism, a clutch and automatic control therefor to operate a machine, such as a dry cleaner, washer, or the like, in predetermined sequential cycles or periods, together with a door-locking means likewise automatic in its operation, and wherein said clutch and door-locking means are interlocked by the automatic control to prevent error in use or action of the machine in the event there occurs a misoperation or failure in the control system or a mistake on the part of the attendant in charge.

And it is a further object to provide in a combination electric and pneumatic-control apparatus, a system of switches and valves so interlocked that their coordinate action is insured against initiating a miscontrol or out-of-step starting action in the event of carelessness or ignorance on the part of the attendant, as well as in the event of some failure or breakage of a member in the automatic-control train of mechanism. Thus, I prevent misoperation or error, in the automatic functions of the power-driving mechanism, to protect the operator and the machine against injury.

It is also an object to provide an automatic and safe control for governing the sequential operation of a motor means and for a combined switch and door lock on a washer, to the end that when said motor means is reversibly operating at slow speed to wash or dry tumble, the door of the washer may be opened to inspect the work inside thereof, but with assurance that the machine will stop as well as start when said door is again closed; and, furthermore, when said motor means is running the washer at high speed for centrifugally extracting the liquid from the work, said door is positively locked against being opened.

Likewise, a feature of the invention resides in the combination of several motors, for example two electric motors, wherein the shaft of a one-direction fast motor, when it is deenergized, acts as a countershaft carrying speed-reduction pulley means, or like power transmission, and through which the other motor oscillates the driven machine at low speed, together with an automatic clutch for disconnecting the latter motor when the first motor is energized for its fast operation.

A further purpose is to produce a full automatic-power control, over a dual electric-motor set, which is smooth and rapid in its function of transferring from one operating cycle or washing step to another. To this end, there is provided a quick clutch release which uncouples a reversible slow motor from the driving line when a fast one-direction motor is cut on to spin the machine at high velocity, and smoothly transfers back again to the slow motor by a gradual clutch engagement.

By employing this invention, it is possible, therefore, to efficiently and positively put a piece of machinery, for example a dry-cleaning washer or other type of machine, through its paces or several operating stages comprising first, its reversible-washing oscillation at low speed, then extraction at high speed, and back again to its oscillating cycle to effect a dry tumbling operation, all without manual aid or attention from beginning to end.

With the foregoing objects and others in view, there is shown in the accompanying drawings several embodiments of the invention, among which are two appropriate combinations or examples of pneumatic controls which are responsive to a timing means to govern the coordinate actions of a multi-motor set or power mechanism comprising a reversible washing-and-tumbling slow motor, together with a one-direction extracting fast motor, and a door-locking means on a new form of cabinet best suited to the requirements of not only housing the washer means per se, but the power mechanism for driving the same.

One type of washer means and new cabinet therefor, preferably employing for its efficient commercial use, my new automatic-power drive claimed herein, is represented by a companion invention, disclosed in my copending application entitled Dry cleaning unit, filed October 14, 1935, in the United States Patent Office, Serial Number 44,823, and more particularly claiming the new combination in a dry-cleaning machine, including its automatic features.

In illustrating my invention, certain of the drawings herewith show its embodiments in diagrammatic form, while other views show a commercial form thereof. It is understood that the construction of the washer itself, the pneumatic controls for my power drive, and the electrical wiring and switches, are all presented in simple form for the purpose of explaining the principles of this new combination. For clarity, the more important parts of the apparatus are somewhat enlarged in proportion to other members. Thus, in constructing my apparatus, it is appreciated that various changes in form, arrangement, position, or relation of the various elements of the combination, as well as employment of appropriate equivalent parts, may be made without departing from the principles of my invention.

The electro-pneumatic controls, in the drawings herewith, are positioned to show in sequence several of the essential steps or driving cycles of a washing, or say a dry-cleaning machine; first, Sheets 1, 2 and 4 considered together show a slowspeed reversing (or what may be called an oscillating) action of a washing drum in a vat of cleaning liquid, hence the first cycle; second, Sheet 3 shows a whirling of the drum to extract the cleaning liquid from the work (second cycle) and said cleaning liquid having been drained from the vat; and third, Sheet 4 again shows the drive transferred back to its initial slow-speed reversing action for dry tumbling (third cycle) the extracting work. The control elements of the new combination are set, therefore, in their respective positions automatically assumed for the sequential performance of the three exemplary steps named. The invention is useful, however, in carrying out other or additional driving cycles of a laundry machine or the like.

The wiring diagram of the drawings show heavy lines for the main power or in-put circuits leading to the two driving motors, while the medium-heft lines distinguish the valve-relay circuits for controlling the electro-pneumatic system, and the light lines by contrast show the switch-relay circuits which control the power-circuit switches for the motors. The wiring diagrams omit for simplicity an electrical transformer of suitable make usually employed in the commercial form of this apparatus for stepping down the voltage of the relay circuits. Otherwise, the accompanying drawings are made from and show the manufacturing plans and shop drawings, in principle and structure, in accordance with the form of the market type apparatus of proven utility.

Taken together, Figures 1 and 2 represent a progressive development of the invention, the first view showing, conventionally, a twin-electric motor-driving set with its power and switch-relay control circuits, while the second view brings in the valve-relay control circuits, and thus completes so much of the combination. The position of the controls in both views show the reversible-slow motor in operation, thus showing oscillation of the washer during either its first cycle (washing) or its third cycle (dry tumbling), as will be understood. Hence, the two views show the alternate position of the controls for effecting the automatic operations of the slow motor, the solid and broken arrows adjacent the armature thereof indicating its reverse actions. Finally, the electrical-wiring system, as developed in Figures 1 and 2, is common to both forms of pneumatic controls shown in Figures 3 and 4.

Taken alone, Figure 1 is a diagrammatic outline of the combination reversible-slow motor and a one-direction fast motor with their respective power and relay circuits. The right-hand side of this diagram also shows, conventionally, a cycle timer for governing the switch-relay circuits for reversing the slow motor. In this view, the slow motor is running counter-clockwise, as shown by a solid direction arrow adjacent the armature. An understanding of this much of the invention is a guide to the general electrical combination shown in the next view.

Figure 2 is a composite diagram of the general combination, in my electro-pneumatic system, used in controlling the power mechanism for driving any washing machine, a small end elevation of the latter being indicated in this view, and on which is mounted my new door switch shown conventionally. In this view the rotation of the slow motor has reversed. It is running clockwise, as indicated by the solid direction arrow.

Figure 3 is a schematic view of the first form of electro-pneumatic control system for a laundry or other machine, especially showing a quick-action direct interlock between a pneumatic clutch and a door lock. The controls here are set for the second cycle (extracting), during which the washer door and its switch are locked closed, and the clutch is locked disengaged so the reversible-slow motor is positively cut off with the one-direction fast motor positively cut on for an automatic run of predetermined time. Consequently, in coming to this extracting cycle, the reader will assume that the automatic controls in Figures 1 and 2 have now taken new positions by which to transfer to the extracting cycle.

Figure 4 shows a second form of the invention. The controls are set for the third cycle (dry tumbling) and hence the mechanism is back to the slow-oscillating drive. This form, like the first, provides for the gradual engagement of a pneumatic clutch so as to effect an easy transfer of the load from the fast drive back to the slow drive, and hence a smooth coupling or clutching in of the reversible-slow motor. The door lock is released, a position it automatically assumes during the several slow-driving cycles.

Figure 5 is an enlarged cross-sectional view on the line 5—5 of Figure 3, showing an example or one form of my electro-pneumatic clutch, serving to illustrate the principles of the invention.

In Figures 6, 7 and 8, the invention is shown in one of its commercial embodiments, and brings together a new cabinet (comprising in part my companion invention) and the present power mechanism into a new full-automatic washing-machine combination comprising a single unit.

Figures 6 and 7 are side elevations of my preferred form of cabinet containing any suitable form of washing apparatus in general, and my new automatic-motor means in particular. These views show the door-locking means mounted in its preferred location near the upper part of a washer cabinet.

Figure 8 is a rear-end view taken on the line 8—8 of Figure 7 and showing the automatic-motor means within the cabinet and comprising a new combination as regards this branch of my invention.

Figure 1:
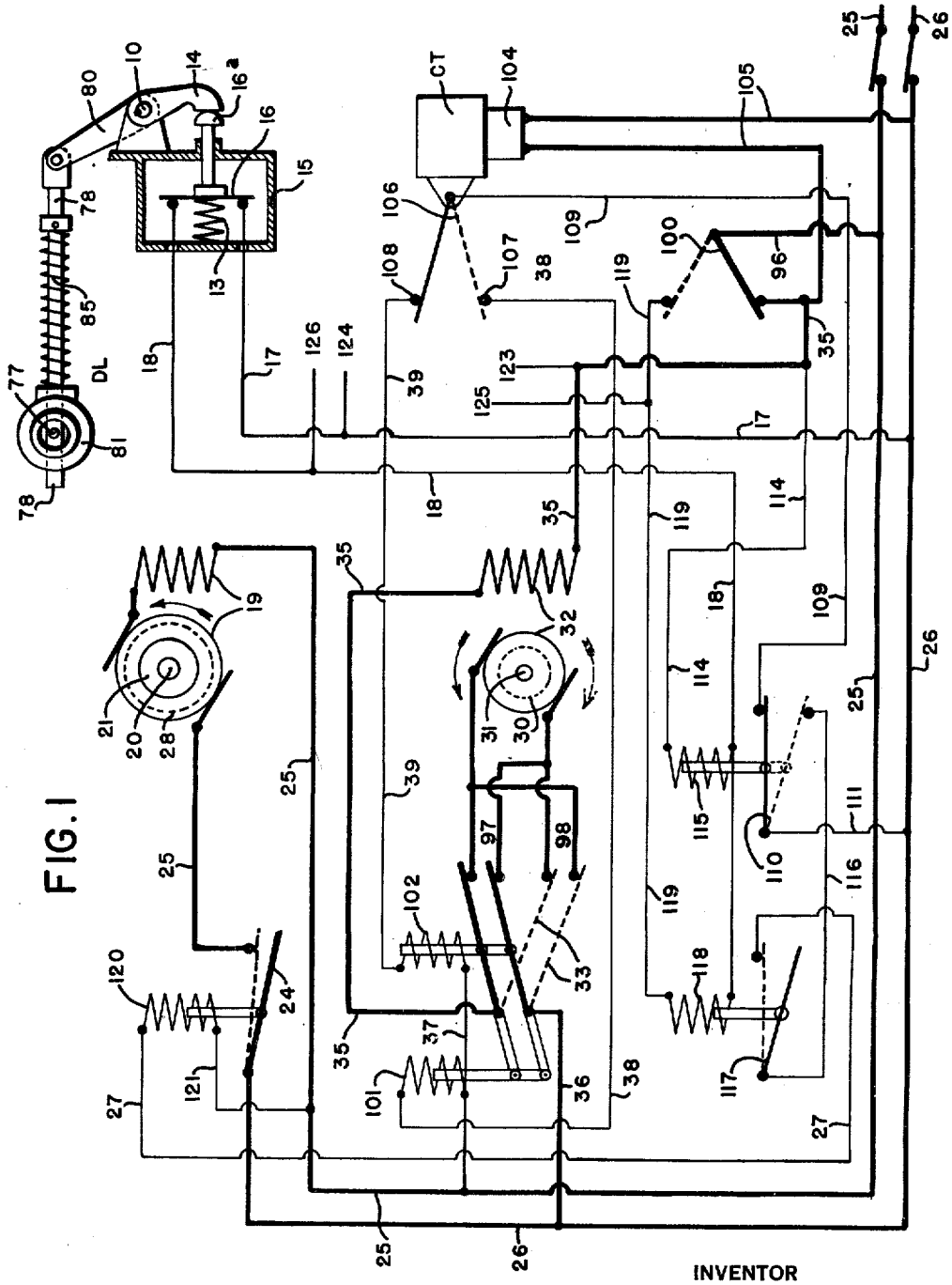

*An example of machine operated by this automatic drive*

An exemplary showing is here made of a portion of the cabinet type of machine shown in my copending application, i. e., so much of it as seems helpful in fully explaining the principles of the instant invention, and so much thereof as constitutes a part of this new combination. My machine comprises a closed cabinet 2 containing the washer or dry-cleaning means per se, and such parts of the latter, not necessary to an understanding of the present invention, are not shown herein.

The structural views (Figures 6, 7 and 8) show a form of housing or cabinet 2, specially designed and adapted in its construction, for enclosing the automatic-motor means of the present invention in a desired driving relationship with the washer means per se mounted within said cabinet, and I will for convenience, therefore, generally refer to that type of cabinet throughout the description herewith. Briefly at this stage of my disclosure, it is noted that the cabinet 2 is provided with a side opening 3 leading into the motor or power-apparatus compartment located toward the rear and at the lower portion of said cabinet, and this opening may be enclosed by a cover 4. Since my motor means is well suited for driving other forms of washers, I have illustrated, conventionally, in other views, a simple form of washing machine designated by the same reference 2. This arrangement more readily permits of a comprehensive understanding by spacing the elements of the combination apart and thus showing my automatic two-speed reverse-driving motor means outside the cabinet.

A washing machine usually has a cylindrical tub or washing-liquid vat 6 mounted stationary within its cabinet 2. Figure 3 shows a short vat 6 for clarity, while Figure 4 shows the vat extending the full length of the cabinet 2 so that the spaced vertical side walls of the latter close the ends of the vat and support it in said cabinet. This vat is mounted horizontally and is liquid or water tight to hold the cleaning solvent or other liquid indicated generally as the washing liquid WL standing at a suitable level, as noted in Figures 2 and 7. The horizontal washing vat 6 may protrude somewhat, forming a convex or arched front wall sector 5 of the machine cabinet. Such a cabinet and vat design places the forwardly curved wall 5 at a working level convenient to an operator and affords a handy location for an outer door on the cabinet.

A washing drum or cylinder 7 is mounted concentrically within the washing-liquid vat 6 and rotates through the solvent bath or washing liquid WL. Such a washing drum 7, sometimes called a hydro-wheel or a washing wheel, comprises the receptacle or work-holder for the clothes or other work to be washed, extracted, and dry tumbled, in the three automatic cycles named, without removing the work therefrom. A shaft 8 is journalled in bearings at the side walls of the machine housing 2. This shaft is fixed to the combination washing, tumbling and extracting drum 7 for supporting and rotating the latter within the vat 6 containing the cleansing liquid.

The drum 7 is usually perforated to allow the washing liquid WL to flow in and slosh through the work and subsequently whirled out, thus washing the clothes by a process of reverse tumbling and centrifugal extraction. A clothes washing drum of this character may be compartmented by dividing it into a number of pockets (three serve the purpose) so the work can be classified and also more evenly distributed about the center 8 of rotation. A door 9 is carried on a horizontal pivot or hinge shaft 10 pivotally mounted on the front of the cabinet 2. This door rests on the front convex wall 5 of the vat 6 and closes an entrance leading to the rotatable drum 7. A handle 11 enables you to swing the door 9 up into open position to gain access to hydro-wheel 7 for loading and unloading it.

The usual peripheral slide doors over the several pockets of the washing drum 7, as well as other features in a washing machine, which may not directly relate to the instant invention, are not shown herein, but constitute subject matter in my copending application. I proceed, therefore, to a description of features more particularly relating to the present combination.

*The multi-motor set and its power transmission*

Important elements of the automatic control for the motor means are associated with or carried on the machine cabinet 2. It is noted that the door-supporting pivot shaft 10 is preferably fixed to or near the upper margin of the door 9. For example, the shaft 10 may extend through and be pinned or otherwise fixed to one or more integral door brackets, as indicated at 12. Lifting the door 9, therefore, rocks this shaft 10, the left-hand end of which is shown adjacent a switch box 15. Any suitable form of door switch 16 is operated by the end of the door shaft 10 and is housed within the box 15.

The door switch 16 is in series in a combined valve and switch-relay circuit 17, 18 to open and close said circuit. It is employed for safety purposes to prevent or stop the operation of the multi-motor set and its power transmission for driving the work-carrying drum 7, in the event the attendant does not properly close the door 9, or in event he opens it, or attempts to do so, while the machine is operating under power during any cycle thereof. In Figure 2, the switch 16 is shown schematically, in open position by dotted lines, as the door 9 is swinging open. Figures 3 and 4 shows, respectively, the switch 16 and door 9 in closed and open positions.

Figure 1 shows the door switch 16 from the left-hand end of the cabinet 2, and it is illustrated, conventionally, as a spring-loaded switch in one of its simpler structural forms. A door-locking means DL is also shown here, but its relation to the shaft 10 and switch is described later. The door in closed position holds the switch closed, and opening the door opens said switch. A spring 13 opens the switch 16 when a door arm 14, fixed on the shaft 10, swings to the right and up away from the switch box 15 as the door 9 swings open and rocks said shaft. The arm 14 thus uncovers and frees a switch plunger or button 16a projecting through the front of switch box 15, whereupon the spring 13 breaks the switch blade 16 away from its closed position in the valve and switch-relay circuit 17, 18.

It is noted that the insulated push-plunger button 16a, carrying the switch blade 16, projects from the box 15 handy for manual operation, and it can be pushed closed readily by the attendant of the machine to momentarily close the circuit 17, 18 when the door 9 is open and the switch arm 14 is in up position back out of one's way. Later on, it will be understood how this push button 16a gives the attendant a safe manual "inching" control of the power mechanism to slightly advance the drum 7, when the outer roor 9 is open, so as to conveniently align the inner pocket doors (not shown) of the washing drum 7 with the outer door on the cabinet 2.

It is now seen that the switch 16 is actuated automatically by one end of the rock shaft 10 due to swinging movement of the door 9, and may be manually closed by the button 16a. Hence, this is a semi-automatic door switch which renders my power mechanism safe and fool-proof. Further utility of the switch 16 and relay circuit 17, 18 is explained later in connection with the electro-pneumatic system. As to the other end of the door shaft 10, it is noted here that its right-hand end is shown operatively connected with a pneumatic door-locking means indicated generally at DL, and this feature of the invention will also be described further on, at which time the functions of the combination door switch 16 and door lock DL will be fully understood.

I employ, for the fast extracting (second cycle) drive, a one-direction high-speed electric motor 19. It is selected for its high torque and quick starting characteristics. A direction arrow in Figures 1 and 2 denotes the constant direction for the armature of this motor. It spins the drum 7, after the washing operation (first cycle) when the washing liquid WL has drained from the vat 6. This fast motor has a double-end armature shaft 20 with a small driving pulley 21 fixed on one end thereof, say the left-hand or outer end. The motor 19 whirls the washing drum 7 through a belt 22 running over the small outside driving pulley 21 and a somewhat larger driven pulley 23 fixed on the shaft 8 of a machine to be driven.

The motor 19 is provided with a relay-operated switch 24 wired in a suitable manner. This switch is shown diagrammatically in Figures 1 and 2, but it is indicated in Figures 3, 4 and 7 as a conventional switch box. A set of power-circuit wires 25 and 26 extend into the switch box and feed current to the fast motor 19, as well as a switch-relay circuit wire 27 to control the opening and closing of the automatic switch 24 for the fast motor, as later described.

The armature shaft 20 of the high-speed extracting motor 19 is provided on its other or inner end with a combination electro-pneumatically controlled clutch and pulley PC. A simple form of clutch clearly illustrates the principles of my invention and shows the mode of operation of this element in the combination. The detail construction of this clutch and other parts vary, but are the same in principle and function for equivalents which may be appropriately selected.

The driven member PC is a clutch, a pulley, and one element in a train of speed-reduction transmission means, all in one, and serves when disengaged to provide for the free operation of the extracting-fast motor 19 when the latter is energized, quite apart from and independent of a reversible washing-and-tumbling slow motor 32, later described. This clutch PC serves to make use of the armature shaft 20 as a driving countershaft when the slow motor 32 is cut on (and the fast motor 19 is deenergized) to oscillate the washing drum 7. These repeating-reverse actions of motor 32 is schematically indicated by full and broken direction arrows in both wiring diagrams.

A pulley 28 of the pneumatic clutch PC is shown as being driven by a belt 29, which in turn is driven by a small pulley 30 fixed on the inner end of the armature shaft 31 of the washing-and-tumbling reversible-slow motor 32. This motor may well have a built-in gear-reduction transmission in its driving head at the pulley 30. Thus, the motor 32 may be smaller and of lower torque, than the previously explained extracting motor 19, and is selected for easy starting, stopping, and reversing actions. This reversible-slow motor 32 rotates the washing drum 7, through the engaged clutch PC, in one direction for a number of turns, and then reverses to rotate said drum a like number of turns in the opposite direction. It repeats this intermittent reversing action of the drum 7 (generally referred to as oscillation) immersed in the liquid WL for washing (first cycle) and for dry tumbling (third cycle) after the liquid is drained from the vat 6.

The slow motor 32 repeats its reversing action, through the agency of an automatic relay-operated reversing switch 33 in the power circuit 25, 26 leading to said motor. The reversing switch 33 is shown conventionally in Figures 1 and 2, but it is indicated as a switch box on the reversible motor in Figures 3, 4 and 7. In this instance, two power-circuit branch wires 35 and 36 extend into the switch box and connect with the reversing switch 33 therein; while three switch-relay circuit wires 37, 38 and 39 extend into the box and connect with a solenoid pair for actuating said reversing switch housed therein, as later described.

It is now understood that the smaller motor 32 has a slow-speed reverse-acting driving pulley 30 for oscillating any driven machine; and hereinafter I usually refer to this electric motor as the slow motor. To like convenience, the extracting high-speed motor 19 is hereinafter generally designated the fast motor.

The form of clutch PC herein shown, has the hub 42 of its pulley journalled to freely rotate on the armature shaft 20 of the fast motor 19. The pulley 28 has an internal conical-clutching face 43, and is shown here with an integral cylinder 44 projecting axially therefrom. A piston 45 has a limited movement in the clutch cylinder 44, and this piston carries a pressure cone 46 adapted to engage and release the clutch pulley 28. The piston 45 and clutch cone 46 are shown integral, and they are axially bored to receive and slide upon the inner free end of the motor shaft 20. The latter is shown here, for clarity, with a slot 47 in which rides a cross-driving pin 48, the ends of which are fixed in the piston 45, but a splined shaft may be used with this form of clutch.

From the foregoing it is noted that the piston 45, carrying its driving pin 48 in the shaft slot 47, is free for a limited axial movement within the cylinder 44 and upon the end of the armature shaft 20. Furthermore, the shaft 20 and piston 45 with its pressure cone 46, are adapted to freely turn relatively within the clutch pulley 28 and its cylinder 44 when the clutch PC is held disengaged by a clutch-release spring 49. In this way, the fast motor 19 when energized whirls the washing drum 7 in one direction to centrifuge the work without driving back through the belt 29 to the slow motor 32.

It is seen that the clutch-release spring 49 will compress as the clutch member 46 is brought into engagement with the driving pulley 28. This is accomplished by a charge of compressed air admitted to the head of the cylinder 44 through an air line 51. The air forces piston 45 to the left, thereby engaging the clutch member 28 and 46, as shown in Figure 4. Such action operatively connects the slow motor 32 with the washing drum 7, for oscillating the latter, through the idle armature shaft 20 of the de-energized fast motor 19. The stationary air line 51 is fitted with a suitable stuffing box where it enters the rotatable clutch cylinder 44 to render this connection air tight.

The compressed-air line 51 is under the control of an electro-pneumatic valve means later described. Suffice it to say here, that a charge of air will be shown to be automatically admitted, through the air line 51 into the cylinder 44, to engage the clutch PC (Figure 4) in a smooth and gradual manner when the reversing switch 33 closes to energize the reversible-slow motor 32 and the switch 24 opens to de-energize the one-direction fast motor 19. Conversely, the charge of air, holding the clutch members 28 and 46 engaged, is quickly exhausted to atmosphere when the switch 33 opens and the switch 24 closes. This triple-automatic function is timed, in relation to the three operating cycles of the machine 2, through the agency of the electro-pneumatic control system to be described.

With the foregoing in mind, it is now seen that the fast motor 19 and the slow motor 32 are never energized at the same time, but are adapted for independent electrical-power operation, although clutched together in the power transmission or driving line for a joint motion-transmitting function. The slow motor 32 drives through the clutch PC and the idle shaft 20 for oscillating the washing drum 7, that is, for rotating it, say six to twelve turns in one direction and then repeating in the opposite direction. The number of rotations before reversing depends upon working conditions, experience and practice, and is a matter of choice, in setting the cycle action of the automatic-motor means to the appropriate requirements of the driven shaft 8 of a machine 2. Note, however, that some four or five reverse actions per minute and driving the drum 7 at about 30 to 40 R. P. M. is suitable for the washing and the tumbling cycles or operations; and that 350 to 400 R. P. M. is found satisfactory for the extracting cycle.

In the foregoing embodiment, it is noted that the belt transmission 29, over the small reversible-driving pulley 30 and larger driven clutch pulley 28, acts to reduce the speed of the driven-motor shaft 20 when the latter is idling as a counter-shaft. This shaft 20 carries the small pulley 21 for driving the larger pulley 23, thus further reducing the speed from the initially-driving slow-motor pulley 30 up to the finally-driven pulley 23 on the washer shaft 8. Thus, I have made the motor shaft 20 common to both motors; first, acting as an ordinary armature-driving shaft for the fast motor 19 when it is energized; and second, acting as a driven speed-reducing counter-shaft when said motor 19 is de-energized.

While my dual-motor set 19, 32 shows a belt-and-pulley power transmission for simplicity, there may be occassions where other forms of a power transmission line, such as a gear-reduction transmission or the like, may be employed to advantage, and thus derive the same benefits of this invention. In any case, the reversible motor 32 exerts a powerful torque and gains a substantial mechanical advantage in driving through the idle counter-shaft 20 of the de-energized motor 19. With the clutch PC disengaged, the slow motor 32 and its driven-clutch pulley 28 are at rest. Thus, I am able to connect, in a simple and positive way, my two-speed alternately slow and fast motor-driving means, capable of oscillating and whirling the washer drum 7 in cycles, at one point on the latter, say at the pulley 23; and this is found to offer marked advantages over certain other forms of more complicated change-speed reversing-washer drives.

I have grouped the motor means and washer axis in parallel relation, hence bringing all shafts 8, 20 and 31 into a convenient driving couple. This affords direct power application at right angles to the several axes of rotation and freedom from end thrust on the shafts and bearings in the driving line of any suitable transmission which one may desire to adopt for use in connection with this inventon. More particularly, this arrangement lends itself well to a compact emplacement of the power apparatus, when desired, within the side opening 3 of the motor compartment in the cabinet 2. The features pertaining to the assembly of the power apparatus in combination with the special form of cabinet 2, shown in Figures 6, 7 and 8, are explained later.

*The electro-pneumatic control system, more especially the first form shown in Figure 3*

This view shows the electro-pneumatic controls set for the extracting operation (second cycle) with the clutch PC disengaged to uncouple the slow motor 32, and the ensuing description is made in general to this fast-cycle driving by the high-speed motor 19. Likewise, it is to be said here that the door lock DL (later described) is positively set against careless opening of the door 9 while the large drum 7, now operating as an extractor, is whirling at high speed.

My full automatic power drive embodies one or more electro-pneumatic devices for actuating certain elements in this new combination, for example, the clutch PC heretofore, described, as well as a door lock previously indicated generally at DL for the door 9, and now an exhaust-and-interlock device EI (later described) which constitutes an intermediate or interdependent control for the clutch and door lock. The electro-pneumatic means for controlling these three pneumatics are shown here as one or more solenoid-actuated valve units or sets SV which are operated automatically by switch-relay circuits. A simple form of a packless double-poppet valve unit is used in this example of the invention. In the present case, two solenoid-valve units SV are shown, and they are alternately actuated so as to function independently with the fast motor 19 and the slow motor 32. A description will be given first of the solenoid-valve unit SV, 54 which admits fluid pressure to the previously named clutch air line 51, and I will then bring in the other unit SV, 73 which coordinates all three pneumatitc devices PC, DL and EI.

A source of compressed air is had from an air-supply pipe 52 coming from an air compressor and extending into an air manifold or header 53 of appropriate length to take the required number of the solenoid-valve sets or units SV, two of which are shown. One of these electro-pneumatic valve units SV is a clutch-control valve and comprises a housing or valve cage 54 mounted on and communicating with the air manifold 53. The valve 54 is shown here (Figure 3) shutting off the air pressure to the clutch PC since the latter is disengaged while extracting with the fast motor 19. This control valve 54 for the clutch PC contains a clutch-inlet valve 55 shown closed but, when open it admits a flow of air pressure from the manifold 53 into an air line 56 having an interlocked communication through the pneumatic EI with the previously named air line 51 going to the clutch cylinder 44.

The clutch-inlet valve 55 (shown closed) is carried on one end of a stem 57, and a venting or exhaust valve 58 (shown open) is spaced therefrom and is also fixed on the stem. A spring 61 is mounted in the lower end of the valve cage 54 and normally holds this double-poppet valve unit in up position with its inlet valve 55 closed and its exhaust valve 58 open. The air pipe 56 connects in between the spaced seats of the valve pair 55, 58 with the valve housing 54, the latter being shown with one end thereof open to atmosphere and the exhaust or vent valve 58 mounted in this open end. The reverse and operative setting of this valve pair 55, 58 is effected electromagnetically (Figure 4) against the spring 61.

The valve stem 57 is attached to the lower end of a solenoid plunger 59 mounted on the valve housing 54. The plunger 59 is adapted to be attracted inwardly or pulled down into the winding of a solenoid coil 60 when energized. This action changes the valve setting by closing the venting valve 58 against its exhaust seat and opening the clutch-inlet valve 55 away from its seat (Figure 4) when the power mechanism transfers from fast motor to slow motor drive. The valve spring 61 restores the valve pair 55, 58 to clutch-disengaged position (Figure 3) when the solenoid 60 is de-energized. The venting valve 58 then keeps the air line 56 open to atmosphere when the clutch PC is disengaged, and the inlet valve 55 shuts off the manifold 53 from air pipe 56.

The air tube 56 connects with the previously named tube 51 through a combination exhaust-and-interlock device EI, the housing of which is indicated at 63. This housing is chambered and has an inlet port or seat 64 spaced from an exhaust port or seat 65. These spaced seats form a valve chamber with which the two air lines 51 and 56 are connected, and said chamber vents the clutch air line 51 to atmosphere out through the exhaust port 65. A clutch-interlock valve 66 is movable within this valve chamber, between its two spaced seats 64 and 65, and is carried on a stem 67 guided in the valve-interlock housing 63. The single-poppet interlock valve 66 is shown to be held closed (Figure 3) on its inlet seat 64 during this extracting cycle, and it functions as a clutch exhaust-and-interlock by opening the clutch cylinder 44 to atmosphere through the exhaust port 65 and interlocking the air line 56 and clutch-inlet valve 55 against accidental admission of air to the line 51.

Although shown closed, the clutch-interlock valve 66 is normally held to a restored position on its other seat or exhaust port 65 by a spring 68, thereby sealing the valve chamber from communication with the atmosphere out through said exhaust port 65. In such position (the reverse of Figure 3) the pipes 56 and 51 are then in direct communication from the clutch-control valve 54, thence through the interlock device EI, and to the clutch cylinder 44. Normally, therefore, when the apparatus is not in use, the air manifold 53 remains cut off from the clutch cylinder 44 only by reason of the clutch-inlet valve 55 remaining spring closed. The interlock valve 66 will be shown to be positively held to its interlock seat 64 by the pneumatic EI only during the fast motor operation against possible or accidental misoperation (opening) of the clutch-inlet valve 55 due to any unforeseen cause.

The clutch exhaust-and-interlock valve 66 is adapted to be held on its inlet seat 64, against the return spring 68, by any suitable pneumatically-actuated means associated therewith. In the present example, this pneumatic-valve holder consists of a diaphragm chamber 69 sealing therein a flexible diaphragm 70 which bears against the head of the valve stem 67 when said diaphragm is flexed under a charge of air pressure automatically admitted through an air line 71 interconnected between the door lock DL and the diaphragm chamber 69, as later described. The diaphragm 70 when under air pressure, therefore, acts to positively seal off the air supply from the manifold 53 to interlock the clutch PC against misoperation or premature engagement when the fast motor 19 is running, and when relieved of pressure causes the air line 51 to vent from the clutch PC to atmosphere.

The other solenoid-valve set SV comprises a door lock-control valve in the form of a housing or cage 73 carried by or communicating with the air-supply manifold 53 common to the several pneumatic devices employed in this new combination. An air pipe 74 connects this valve 73, through a by-pass check valve 75, with the previously named air pipe 71 interconnected between the door lock DL and the clutch exhaust-and-interlock device EI. A pressure-accumulator tank 76 is included in the air line, beyond the by-pass check valve 75, say in the line 71, and imparts air capacity or reserve to the pneumatics DL and EI to prolong their holding function. This serves to maintain the door 9 sealed and prevents premature engagement of the clutch PC until the fast motor 19 and washing drum 7 have come to rest, as will be shown.

The door lock itself has been designated DL, and one species thereof will be explained as an example. It comprises a locking bolt or pin 77 adapted to be pneumatically projected into a locking notch or hole in a coacting swingable locking slide 78 pivotally attached to an arm 80 fixed on the door shaft 10, say at the right-hand end thereof, as heretofore mentioned. The slide 78 and its locking bolt 77 are preferably guided at right angles to each other within the base of a rockable casing 81, 82 mounted on the side of the machine 2. This casing comprises the bored base and chambered member 81 mounted for relative rocking movement on a pivot flange 79 secured to the vertical wall on the outside of the machine cabinet 2. The locking pair 77, 78 is operatively fitted within this base. A convex cap 82 affords flexing space for a diaphragm 83 sealed on the concave head of the base 81.

The air line 71 connects with cap 82 and is adapted to direct a charge of air into the sealed portion of the diaphragm casing, thus deflecting the diaphragm 83 against the ovalled head of the locking pin 77. This drives the latter into locked position within or against the locking slide 78 when the door 9 is closed, thus locking said door against being opened. A spring 84 retracts the bolt 77, frees the locking slide 78 so the door 9 may be swung open, and restores the diaphragm 83 to deflated position toward the cap 82, all taking place when the pressure is exhausted back through the air line 71, 74.

The swinging reciprocal motion of the slide 78 within the lock housing 81, 82 rocks the latter on its pivot 79. To accommodate the air tube 71 to this relative motion, where it enters the cap 82, a coil 72 is preferably made in several wraps, to be noted in Figure 8. The rocking action thus imparted to the stationary copper or brass air tube 71, when it is anchored in the cap 82, is taken up by the yielding spring action of the turns forming the coil 72. This provides a relative-motion connection between the stationary air line and the pneumatic door lock DL which rocks with the shaft 10 as the door 9 is opened and closed. This action of the door 9, its lock DL and air-tube coil 72, is best understood by noting Figures 7 and 8.

A door counter-balancing spring 85 embraces the swingable locking slide 78 and is under compression between the diaphragm casing 81, 82 and a shoulder on said slide. The coil spring 85 reacts and pushes on the arm 80 like a crank, as the door comes down, to urge it down and tightly shut and also to urge the door up and hold it open. This alternate or two-direction push on the door 9, by the spring 85, comes into play when the door arm 80 passes a dead center position, either going up or down, the spring 85 compressing at its maximum when the arm 80 and slide 78, having a toggle action, reach a straightened or aligned position. Thus with the door 9 poised in its mid position, the compressed spring 85 reacts and urges said door, through the toggle 78, 80, toward either position to which the attendant is moving it. This spring and toggle action is combined in the door lock device DL to provide a balanced and firm action, makes the door easy to operate manually, and retains the door in either of its positions.

The foregoing explains the door action, and how the shaft 10 is locked against movement by the pneumatic device DL with its locking pair 77, 78. Since the door 9 is fixed at 12 to this shaft and the flexed diaphragm 83 will be shown incapable of immediate release due to trapped air pressure in the diaphragm casing 70 and attached air lines, it follows that the door cannot be opened until after the fast motor 19 stops and the whirling drum 7 coasts to a stop. This is an interlocked condition achieved through the agency of the parts above described which are under the immediate control of the by-pass check valve 75 and solenoid valve unit SV, 73, now further described.

It is noted that the door-lock control valve 73, like its companion solenoid valve 54, is fitted with a double poppet comprising a door-lock inlet valve 87 as well as an exhaust 88 opening to atmosphere through the upper open end of the valve housing 73. This valve pair is carried on a stem 89, the outer end of which is attached to a solenoid plunger 90 adapted to reciprocate downwardly in a solenoid coil 91 when energized. The valve heads 87 and 88 are spaced apart and co-act with spaced valve seats between which is disposed an air port communicating with the pipe 74 leading to pipe 71.

In Figure 3, where the controls are set for the fast motor 19, the door-lock control valve 73 is in operative position. The solenoid 91 is energized, thus attracting inwardly and holding its plunger 90 and valve stem 89 against a valve-restoring coil spring 92. Consequently, the inlet 87 is open and the exhaust valve 88 is closed, thereby directing a charge of fluid pressure from the manifold 53 into the air line 74 communicating through the by-pass check valve 75 with the air tube 71. When the solenoid 91 is de-energized, the compressed valve spring 92 reacts and reverses the valve pair to normal (Figure 4) position, i. e., the inlet 87 closes and the exhaust 88 opens. The air pressure in the header 53, as well as the spring 92, then serves (as in Figure 4) to normally hold this solenoid-valve unit SV, 73 in closed venting position, thereby opening to atmosphere the air line 71, 74 and its diaphragm chambers 70 and 82 through a by-pass of the check valve 75 to be described.

Coming back, however, to the by-pass check valve 75 (Figure 3), it is noted that the air pressure from the line 74 (the solenoid 91 being energized) unseats a check valve 93 against a return spring normally closing it, as readily understood. Hence, the full charge of air pressure flows freely through the large port uncovered by the check valve 93 when the latter opens, as indicated by the direction arrows in Figure 3. The air quickly flows into the line 71, fills the air tank 76, and actuates the two pneumatics DL and EI without any delay occasioned by the check valve 93 in the air line 74. The air thus accumulated in the tank 76 and two diaphragm chambers 69 and 82 is, therefore, trapped by the closed check valve 93 which seats when pressure equilibrium is attained in the air lines or tends to reverse. This is noted in the other view (Figure 4) with the air pressure pushing back, to be seen by the direction arrows.

Consider now the important action of the by-pass valve 73. It performs a similar purpose in both forms (Figures 3 and 4) of the combination. Upon the exhaust flow of the air back through the lines 71 and 74 or 137 (when the solenoid 91 is de-energized) the pressure seats the check valve 93. The venting of the air lines, while thus retarded, is nevertheless effected through a small by-pass port 94 leading around the closed check valve 93 sealing its large inlet port. A threaded-needle valve 95 is adjustably set in relation to the leak or small by-pass port 94. This retards the exhaust of the trapped pressure in the air line 71, 74 and tank 76 out through the door-lock exhaust valve 88 and the escape of the pressure to atmosphere through the open upper end of the valve housing 73. I have provided, therefore, for a regulated slow escapement of the pressure initially stored in the tank 76 and its connected air lines.

The foregoing air-pressure control, and the proper size adjustment or restriction of the by-pass port 94, by the needle valve 95, constitutes an important feature of the invention. It serves (Figure 3) to maintain the pneumatic diaphragms 70 and 83 inflated, thereby holding the clutch-interlock valve 66 closed against its seat 64, as well as holding the door-bolting means 77, 78 in locked position. The previously charged air tank 76 lends capacity to the air lines 71 and 74, thereby effecting the prolonged holding action until it is safe, for the attendant in charge and the motor-driving means, to automatically release the door lock DL and the clutch air line 56.

The slow venting by-pass valve 94, 95 enables the air to maintain both diaphragms 70 and 83 in an inflated state until the drum 7, rotating at high speed, comes to rest after the extracting motor 19 is automatically cut off. The air tank 76 especially affords sufficient capacity to avoid undue sensitiveness in adjusting the needle valve 95 and makes it easier to set the time for the retraction of the door bolt 77 by its spring 84, and the retraction of the clutch-interlock valve 66 by its spring 68, when or after the whirling hydro-wheel 7 coasts to a stop. This delay-action release of the door lock DL and clutch exhaust-and-interlock EI is an important mode of operation in my invention to be appreciated when it is understood that the large drum 7 whirls at high speed in the liquid-free vat 6 during the extracting cycle. Hence, the absence of the washing liquid WL and the speed of the drum 7 means that more time is required for it to coast to a stop before it is safe for the operator to open the door 9, and before the machine is ready for engagement of the clutch PC when transferring back to (third cycle) dry tumbling.

Another important function of the trapped air in the air lines 71 and 74, given capacity by the tank 76, is to smoothly engage the clutch PC, especially when transferring from the fast drive back to slow drive. In this connection, the slow escape of the air from the tank 76 and its air lines, through the adjustable by-pass valve 94, 95, quite gradually eases up on the diaphragm 70 in the pneumatically controlled clutch exhaust-and-interlock device EI. Hence, the spring 68 under the interlock valve 66 very gradually unseats the latter. In this way, the air pressure does not rush from the pipe 56 into the line 51 leading to the clutch cylinder 44 (when the clutch-inlet valve 55 opens), but slowly feeds to the clutch air line 51, with the result that the clutch piston 45 slowly moves to the left and gradually brings the two clutch members 28 and 46 into smooth driving engagement. The load, therefore, is readily picked up by the slow motor 32, and what little relative motion exists, between the clutch 28 and its coacting pressure cone 46, is gradually reduced and no jerking occurs in the belt or other transmission-drive line of the dual-motor set.

The description of the door switch 16 and door lock DL, heretofore given, affords a comprehensive understanding of the new combination in my door assembly. The single door shaft 10 is common to both of these devices, one end of said shaft being adapted to close the switch 16 by pressing on its inching button 16a to start the machine, while the other end thereof coacts with the lock DL to fix said shaft against rocking motion. Thus, the door 9 locked closed also locks switch 16 closed. The door assembly shown, is by way of example and constitutes one simple and positive form of interlocking means which insures the machine of a safe and complete run once it starts the extracting cycle.

*Electrical-wiring system shown in Figures 1 and 2*

The wiring system will now be described, and reference is first made to Figure 1, since it shows the dual-motor driving set with its power and switch-relay circuits per se, following which is added in Figure 2 the valve-relay circuits cut into the motor wiring system to complete the electrical combination. The controls are positioned in both views for energizing the slow motor 32 and oscillating the drum 7 for either the washing or dry-tumbling cycle. This circuit description starts (first cycle, washing) with the slow motor 32 in operation, then cuts on (second cycle, extracting) the fast motor 19, and then transfers back again to the slow motor (third cycle, dry tumbling). This carries through the three principal cycles.

The previously mentioned power circuit branch 35, 36 is connected with the main power circuit 25, 26 through a master switch 100 which controls, by reason of its two operative positions, the separate electrical operation of the slow motor 32 and the fast motor 19. In other words, this is a master oscillating-and-extracting control switch 100, and it is shown connected through a wire 96 with one side 25 of the main power circuit. In its first position (solid line) this switch 100 controls the flow of current to the reversible-slow motor 32 and to the clutch-control solenoid-valve unit 60, 54. In its second position (dotted line) it controls the flow of the current to the one-direction fast motor 19 and the door-lock control solenoid-valve unit 91, 73. The solenoid-relay circuits will be explained later, rather than interrupt the description of the motor circuits here.

It is to be said here that the master switch 100 interlocks each motor 19 and 32 against the other, and each solenoid 91 and 60 against each other, since this single switch 100 can assume only one operative or circuit-making position at a time. In fact, the master switch 100 is shown here, in its first position, as being in the power circuit (heavy lines) leading to the reversible-slow motor 32, while it is merely included, when in its second dotted position, in a valve and switch-relay circuit system (medium and light lines) for controlling the switch 24 in the main power circuit 25, 26 for the fast motor 19 and the solenoid-valve units SV, later described.

Noting principally Figure 1 and first explaining the circuits for the slow motor 32, the current flows from one side 25 of the main power circuit 25, 26 through a wire 96, through the master switch 100 (solid line), and through the wire 35 to the field of the reversible motor 32. Thence, the current flows through one blade of the reversing switch 33 (solid line), through a first commutator connection (of the first brush wires 97) into the motor armature and from the latter through the second commutator connection (of said brush wires 97) out through the blade of said switch 33, and finally through the wire 36 back to the other side 26 of said power circuit. This energizes and runs the slow motor shaft 31 counter-clockwise for some seconds or any predetermined period. The slow motor 32 then automatically reverses and runs clockwise upon changing the polarity of the motor armature by throwing the switch 33 (dotted line) and passing current through a second commutator connection (second brush wires 98), as understood in the motor art. Figures 1 and 2 show the two positions of the reversing switch 33 drawing current from the power circuit 25, 26 so long as the master switch 100 remains (solid line) in its slow-motor position.

The foregoing briefly describes one example of a reversing-slow motor. The conventional form shown is commonly known as a universal motor which can be operated by either direct or alternating current. It is to be understood, however, that any suitable current and motor or motors can be used.

The reversing switch 33, for the slow motor 32, is periodically actuated from one position to another (Figures 1 and 2) by a pair of alternately energized solenoids 101 and 102, each of which has the usual plunger means for actuating the switch contacts, as will be understood. When solenoid 102 is energized, its plunger actuates and holds the switch 33 to a closed position (Figure 1) with the first pair of brush wires 97. When, however, the other solenoid 101 is energized, it throws the switch 33 and holds its connection (Figure 2) with the second pair of brush wires 98. When both solenoids 101 and 102 are de-energized, the switch 33 goes to and remains neutral, and the slow motor 32 is cut off. The three relay-circuit wires 37, 38 and 39, first mentioned in out-lining the motor assembly in Figures 3 and 4, alternately feed current to the solenoids 101 and 102 for actuating the reversing switch 33 through the control of a reversible-motor timer or cycle timer CT of any appropriate form, an example of which will now be described.

The two solenoids 101 and 102 are caused to be alternately energized by the cycle timer CT driven by a small electric pilot motor 104. Hence, this cycle timer is in the nature of an automatic pilot to periodically oscillate its timer switch 106 for alternately opening and closing two independent relay circuits. Any suitable cycle timer CT, or timing switch 106 actuated thereby, may be used for intermittently energizing first one solenoid 101 and then the other 102 for actuating the slow-motor reversing main switch 33. I have illustrated, conventionally, one form of cycle timer CT as an aid to this disclosure.

Such a timing device or automatic pilot may include a speed-reducing gear set CT for periodically tripping or actuating its switch means 106 shown purely schematic as an elementary form of cycle timer, and the motor 104 therefor is supplied current through feed wires 105 appropriately connected with an electrical circuit. In Figure 1, the timer motor 104 has one wire of its feed circuit 105 connected to the side 26 of the main power circuit 25, 26 and its other wire connected to the other side 25 through the master switch 100 (solid line) so as to be automatically cut off when the master switch 100 is changed over to its (dotted line) fast-motor position. I have thus connected (Figure 1) the circuit 105 in series with the master switch 100, since in the present diagrams the small pilot motor 104 is employed only for driving or oscillating its reversing-timer switch 106, the immediate requirement of which is suspended when the master switch 100 goes from its slow-motor (solid line) to fast-motor (dotted line) position.

On the other hand, Figure 2 shows the small timer motor 104 directly connected to the main power circuit 25, 26 and it may, therefore, run all the time, although in this latter event there is provided a switch in the circuit 105 for manually cutting off this motor 104 at such times as may be desired. This latter wiring plan (Figure 2) is preferred where the cycle timer CT is also availed of for operating other automatic switches, in addition to the one timer switch 106 shown here; and occasion arises for such other uses in connection with piloting or controlling the washing-liquid and air-drying lines to be found in automatic washers, especially the dry-cleaner types, but such features are not shown herein.

The small cycle-timer motor 104 may well be driven from a lower voltage line, say through a transformer if desired. A transformer, suited to current and operating conditions is usually employed in my commercial apparatus for stepping down the voltage for the small motor 104 and for other timing switches sometimes operated thereby, and likewise preferably for energizing the valve and switch-relay circuits described herein.

The timer motor 104 appropriately oscillates the timer switch 106, through the suitably geared tripping device CT, between two contacts 107 and 108. The period or amplitude of the timer switch means 106 is predetermined in accordance with the reversing period of the automatic switch 33 for the slow motor 32, and about four beats or reversals per minute is satisfactory for actuating said switch. This reverses the washing-and-tumbling drum four times per minute, as previously mentioned. One timer switch contact 107 is connected through the previously named relay wire 38 to the upper end of one solenoid 101, while the other contact 108 thereof is connected through the other relay wire 39 to the upper end of the other solenoid 102. Both solenoids have their lower ends connected through the wire 37 to one side 25 of the power circuit 25, 26. By bringing current from the other side 26 thereof to the timer switch 106, it is seen how the solenoids 101 and 102 are alternately energized.

In order to complete the circuit through one solenoid 101 or 102 at a time, a wire 109 extends from the timer switch 106 to a relay-operated switch 110. The wire 109 is, therefore, common to both relay wires 38 and 39. The pivoted end of the switch 110 (closed solid line for slow-motor 32 operation) connects through a wire 111 with said other side 26 of the power circuit, thereby energizing either one or the other of the solenoids 101 or 102 through one or the other wires 38 or 39. This is readily traced back from relay wire 37 (connected to one side 25), through one or the other solenoid 101 or 102, through one or the other wires 38 or 39, the timer switch 106 in one of its contact positions, the common wire 109, relay switch 110, and finally wire 111 (connected to said other side 26), as noted in Figures 1 and 2.

The control of the relay switch 110 is next in order, and it will be shown to be a two-position and hence a master-relay switch common to and for controlling the action of both power-circuit switches 33 and 24, and hence the two drive motors 19 and 32. A relay wire 114 receives current from one side 25 of the power circuit 25, 26, through wire 96 and master switch 100 solid line, and connects with the upper end of a solenoid 115, the plunger of which actuates the master-relay switch 110. The lower end of the solenoid 115 is connected with the previously named door-switch wire 18 extending to the door switch 16 on the door 9. The current for energizing the solenoid 115 passes through the switch 16 when the door 9 is closed to the wire 17 which returns to the other side 26 of said power circuit. The solenoid 115 is, therefore, energized to close (lift) the switch 110 (solid line), thus connecting wire 111 with the common wire 109 to transmit current through the timer switch 106 to either the wire 38 or 39 and hence to the solenoid 101 or 102, as previously explained. In this way the master switch 100 and relay switch 110 (both closed solid line) controls the slow motor 32 through the action of the reversible-motor timer CT.

The foregoing slow-motor operation having been completed, after some minutes of back and forth agitation or rotary oscillation of the drum 7 through the washing liquid WL, the liquid will be dumped from the washing vat 6 preliminary to the next cycle of the washing drum which is extraction. The fast motor 19 will now be automatically started for whirling the drum 7, and a description thereof follows.

The master oscillating-and-extracting switch 100 is now manually, or preferably automatically, set to its extracting position (dotted line) for the purpose of cutting off the slow motor 32 and disengaging its clutch PC, and for starting the fast motor 19 and locking the door lock DL. This reversal of the switch 100 (to dotted line position) breaks the previously described switch-relay wire 114 taking current from the feed wire 96, thus deenergizing the solenoid 115 and dropping its master-relay switch 110 to dotted line position, thereby breaking the current to the common-relay wire 109 which cuts off the two solenoids 101 and 102. The slow-motor main switch 33 now goes to its neutral position. The slow motor 32 and washing drum 7 then coast to a stop under the combined retarding effect of the washing liquid WL in the drum (if a washing cycle) and the gear-reduction transmission in the driving head of the slow motor 32.

This new position (dotted line) for the master switch 100 now connects the wire 111 (leading from one side 26 of the power circuit 25, 26) with a wire 116 connected with a relay-operated switch 117 adapted to control the action of the main switch 24 for the fast motor 19. In order to close (dotted line) this fast-motor relay switch 117, a solenoid and plunger means 118 is provided as usual, and the solenoid is energized through the master switch 100 when set for this extracting cycle. Current now flows from one side 25 of the power circuit, through the wire 96, the switch 100 (dotted line) and through a wire 119 to the solenoid 118, thence through the wire 18, the closed-door switch 16, and following the other door-switch wire 17 back to the other side 26 of said power circuit. This tracing of the circuit for solenoid 118 is shown to energize it, thereby closing (dotted line) the relay switch 117 for starting the fast motor 19, as further explained.

The fast-motor relay switch 117 now closed (dotted line) serves to pass current from one side 26 of the main power circuit, through the wire 111, through master-relay switch 110 (dotted line), through wire 116 and its now closed switch 117, thence through the previously named wire 27 leading into switch box 24 and connected with one end of a solenoid 120. The other end of solenoid 120 is connected to the other side 25 of the power circuit through a short wire 121 which may be inside the switch box. Hence, the closing of relay switch 117 energizes the solenoid 120 which actuates its plunger and automatically closes the fast-motor main switch 24, thus completing the power circuit 25, 26 to the fast motor 19. Current now flows from one side 25 of the main power circuit, through the field of the motor 19, through its brush set, and thence back through the main switch 24 to the other side 26 of said circuit. The extracting motor 19 now drives at high speed in one direction, so long as the solenoid 120 is energized under the control of the master switch 100 closed to its extracting (dotted line) position, thus feeding current to solenoid 118 and keeping its switch 117 in up-position, but not feeding current to solenoid 115 and thus leaving its switch in down position.

From the above, it is noted that the relay-switch 117 can pass current to complete the circuit through solenoid 120 to run the fast motor 19 only when the two-position master-relay switch 110 drops to cut off the common-relay wire 109 from the solenoid pair 101, 102 and to cut on the relay wire 27. Consequently, the relay switch 110 is a master switch common to both the solenoid pair 101, 102 and the solenoid 120. This master-relay switch 110, therefore, interlocks the two main switches 33 and 24 against simultaneous actuation. Furthermore, the slow motor 32 and the fast motor 19 is each independently controlled by the master switch 100 having its two positions, only one of which at a time is operative to close a circuit, thus additionally interlocking the two drive motors against being simultaneously energized.

It is noted here that the master switch 100 preferably may be changed automatically from its slow-motor position (solid line) to its fast-motor position (dotted line) by means not shown, although it is readily understood that it may be under the control of a circuit make-and-break device driven, as for example, by the small timer motor 104, heretofore explained. When that is done, the continuously running timer device CT, as wired up in Figure 2, automatically changes the setting of the master switch 100 in accordance with one period fixed for washing, another for extracting, and a third period for dry tumbling before the machine automatically stops to permit removal of the work from drum 7.

The automatic control of both switches 100 and 106 just described removes all error or variation which arises under manual control. As a matter of fact, it is sometimes preferred to provide an optional automatic and manual control, in combination, for the master switch 100, because there may be times when the operator desires to make a special washing or dry-tumbling run of the drum 7 and hence he may have occasion to temporarily take the control of the power drive away from its automatic piloting means. Such joint automatic and manual, or optional control is omitted for clarity and elsewhere covered.

The foregoing description of the circuits cover the slow and fast motors, and has come to the end, say of the (second cycle) extracting operation. Let us, therefore, manually or automatically return the master switch 100 to its original slow-motor drive (solid line) position for dry tumbling (third cycle). The valve-relay circuits, for the previously named solenoid 60 and 91, will now be explained in connection with the two control valves 54 and 73. Reference is made, therefore, to Figure 2 and also to Figure 4 since the latter view shows the position of the pneumatic control system during any oscillating drive by the slow motor 32, say for this dry tumbling operation about to be described.

It is noted that the circuits for the two solenoids 60 and 91 are conveniently shown in medium-heft lines. As previously explained, the solenoid valve set SV, 54 is now actuated (energized) for engaging the clutch PC and coupling in the slow motor 32 with washer shaft 8 for an oscillating drive, while the other unit SV, 73 is now released (de-energized) for unlocking the door lock DL from its locked position.

The foregoing is accomplished by a valve-relay wire 123 having one end connected with the power wire 35 (hence 25 thru switch 100 solid line) and its other end with the solenoid 60 which actuates the clutch-control valve pair 55, 56 to operative (Figure 4) position. The other end of the solenoid 60 is connected through a wire 124 leading back (say through wire 17) to the other side 26 of said power circuit. The circuit is now complete through the solenoid 60 which opens the clutch-inlet valve 55 and closes the vent valve 58, directing a charge of air to the clutch cylinder 44 and gradually engaging the clutch members 28 and 46, as previously described.

It is seen that the electro-pneumatic clutch-control unit 60, 54 is not in series with the door switch 16 because it is desirable that the operator open the washer door 9 without de-energizing the solenoid 60, thus maintaining the clutch PC engaged to bring the washing drum 7 to a stop by the retarding effect of the de-energized slow motor 32, and for the further purpose of better enabling the operator to use said slow motor for "inching" the drum 7 to its door-alignment position relatively to the outer door 9 of the machine cabinet 2.

At this point, the dry-tumbling operation (third cycle) may be said to have been completed, and the machine ordinarily stops automatically after a fixed period of dry tumbling. During any slow-motor operation, the machine may be stopped manually by opening the door 9, and then "inched" along under the power of the slow motor, by the switch button 16a, until the drum 7 is advanced so as to align its doors (not shown) with the outer door 9 on the cabinet 2 so the dry-tumbled work may be removed. During the fast-motor operation, the door 9 cannot be opened because it is locked by door lock DL. In case, however, of failure of the door lock to function properly, the opening of door 9 will of course stop the fast motor 19 because the door switch 21 is in series with the relay switch 117 controlling the fast-motor main switch 24.

The energization of the solenoid 91 took place heretofore and pneumatically set the door lock DL against opening the door 9 (Figure 3) at the time the fast motor 19 was cut on (second cycle) as heretofore explained. That occurred when master switch 100 was set to its extracting (dotted line) position. The current then passed from one side 25 of the power circuit 25, 26 through the wire 96, through the switch 100 in dotted position, along wire 119, and branched up a wire 125 connected with one end of the solenoid 91. The current flowed from the other end of the solenoid 91 through a wire 126, to the wire 18, then through the door switch 16 (if door 9 was closed) and thence through wire 17 back to the other side 26 of the said power circuit.

Accordingly, the solenoid 91 was energized during the foregoing extracting drive, and thus the door-lock exhaust valve 88 was closed and its inlet 87 was open. This sent pressure through the air line 74, inflated the diaphragm 83, set the door locking bolt 77 and slide rod 78 in locked position, and held this relation so long as the master switch 100 held its extracting (dotted line) position. Upon the return of the master switch 100 to its slow-motor position (solid line) the driving mechanism then automatically transferred back to the tumbling operation described above, and then the solenoid 91 was de-energized which opened the air line 74 through the wide-open door lock exhaust valve 88, but the exhaust therefrom was delayed.

The delayed-action release means (by-pass valve 94, 95) functioned at that time to suspend release of the door lock DL until after the washing drum 7 has coasted to a stop, as heretofore described. If the air tank 76 is employed, it readily supplies enough air in the line 71 to keep both pneumatics DL and EI in operative position until the high-speed drum has slowed down or stopped, or the by-pass valve 94, 95 can be finely set so that the venting of the diaphragm chambers 69 and 82 alone is sufficiently slow to accomplish the same purpose as the air-capacity tank 76.

The interlocking controls

These features of safety to the operator and the machine with its automatic-motor means are conveniently brought together in a group for a comprehensive understanding of their joint and several functions. I have provided pneumatic and electrical interlocks, and a combination of both, thus making my automatic-motor means fool proof.

The clutch exhaust-and-interlock device EI locks out the clutch PC against the clutch-inlet valve 55. That is to say, I use the same air-pressure control unit 91, 89 for setting the door lock DL to its locked position during fast-motor operations and also for setting the interlock valve 66 against its seat 64. The interlock valve 66 in effect is a supplementary or a second inlet to the clutch cylinder 44. In this way, I do not depend alone on the proper closure of the one clutch-inlet valve 55 to insure against the somewhat remote likelihood of the clutch PC being engaged while the fast motor 19 is driving.

The air-pressure diaphragm 70 delivers a seating thrust to the interlock valve 66 much in excess to any possible air pressure which might by accident or leakage pass from the manifold 53 to the pipe 56. Proper control over the cycle action of the clutch, as assurance against an out-of-step action thereof, is provided by my dual-inlet valve means 55, 66 as a control over the air-pressure flow to engage the clutch PC and the dual-exhaust valve means 58, 65 as a control to insure positive clutch disengagement by certain and definite venting of the clutch cylinder 44 out through one or the other valve housings 54 or 63. This provides for free venting of the clutch cylinder 44 in the event either valve stem 57 or 67 may by chance stick. This new combination, in a double-inlet valve and double-exhaust valve hook-up, renders apparent that I have fully provided against misoperation and consequent injury to the power mechanism.

The door switch 16 in the relay-circuit line 17, 18 is in series with the single master power-circuit switch 100 for both of its positions. Consequently, both driving motors 32 and 19 are cut off against accidental starting while the door 9 is open. Not only that, but the single master relay-circuit switch 110 also controls the two motors 19 and 32, and consequently this latter switch (like the first) can be in only one operative position at a time.

The semi-automatic "inching" switch 16, having button 16a, is in series with both solenoids 115 and 118 controlling the slow-motor relay-operated main switch 33 and the fast-motor relay-operated main switch 24. The possible opening of the door 9, therefore, breaks the circuit 17, 18 and de-energizes whichever solenoid 115 or 116 is in circuit at the time.

Again the twin-motor master-relay switch 110 and the fast-motor relay switch 117 are interlocked with each other against simultaneous energization of the solenoid pair 101, 102 and the single solenoid 120, which is to say against simultaneous actuation of the two motor main switches 23 and 24. This is due to the fact that the switch 117 when closed (dotted line) can only initiate the starting of the fast motor 19 after the other switch 110 has moved away from its slow-motor (solid line) position.

If by any means the wires 119 and 35 are short circuited to the power wire 96, thereby energizing both solenoids 60 and 91, no damage will be done to the power mechanism since both motors 19 and 32 will merely rotate freely of each other since the clutch PC remains positively disengaged. The clutch will remain disengaged, under such circumstances, because the air pressure will flow to the clutch interlock diaphragm chamber 69 thus thrusting the interlocking valve 66 against its valve seat 64 and preventing air from flowing to the clutch cylinder 44 and keeping the latter open to atmosphere through its remaining open exhaust port 65. The same interlocking action takes place if both solenoid plungers 90 and 59 should by chance be accidentally pushed inwardly.

The motors are therefore completely electrically interlocked, one against the other, through their power circuits as well as their relay circuits, quite independently of any pneumatic safety means.

The solenoid 60, which opens the clutch-inlet valve 55 to slowly engage clutch PC, is not in series with the door switch 16, so that when door 9 is opened during slow motor 32 operation, said clutch remains engaged and thus the slow motor 32 aids in bringing to a stop the washing drum 7. Not only that, but "inching" of the washing drum can be effected readily by manually pressing the door-switch button 16a and thus using the slow motor for advancing the washing drum until its door or doors come even with cabinet door 9. "Inching" could not be as satisfactorily effected if the solenoid 60 was in series with this semi-automatic switch 16 because slow clutch engagement and quick disengagement would hinder the operator in gaging short advances or a partial turn of the drum. The electro-magnetic and pneumatic interlocks, therefore, are so arranged as not to interfere with either the automatic or manual control of the power mechanism.

On the other hand, the solenoid 91, which opens the door-lock inlet valve 87 to set the lock DL, is in series with the door switch 16. When the door 9 is standing open and master switch 100 happens to be set for the fast motor 19 extracting operation, there is no possibility, therefore, of the door lock misoperating to set itself in locked position while the door 9 is standing open in the event of improper setting of the cycle-timing apparatus or the accidental manual closing, say of the relay switch 117, which would start the fast motor 19 while door 9 is open.

In such latter event, the attendant can quickly close the door 9 because no air pressure could have by chance flowed to the door lock DL to prevent him from doing so. The invention, therefore, provides means to prevent premature action of the door lock DL when the washer door 9 is open. When the door is closed, during the extracting operation, both the door and its switch 16 are locked closed by the pneumatic lock DL, and this insures a definite and complete extracting run which normally cannot be interfered with by the operator.

The modified form of electro-pneumatic control shown in Figure 4

This second form of my new combination shows a modification of the pneumatic-control system for the same clutch PC and door lock DL, as heretofore described. The same electrical control system (Figures 1 and 2) is employed, and the wire connections thereof are cut into Figure 4 with the same reference numbers previously used.

I have shown here an arrangement which omits the clutch exhaust-and-interlock device EI (Figure 3) and as a consequence I have connected the previously described delayed-release by-pass check valve 75 of the door lock DL in a single air line 137. The air-accumulator tank may also be included in this air line 137 if desired in order to give capacity to the line as an aid in adjusting its needle by-pass valve 94, 95. In addition, there is added to this new combination a by-pass check valve 130 with its single air line 131 leading to the clutch cylinder 44. The previously described elements in the former combination are designated here (Figure 4) by the same reference characters, with the exception of the substitute door lock air line 137 and the clutch air line 131 with this additional by-pass check valve 130.

This second by-pass check valve 130 is included in an air line 131 directly interconnected between the pneumatic clutch PC and its control valve 54. This is an adjustable by-pass check valve which serves at all times to slowly feed air pressure into the clutch cylinder 44 to gradually engage the clutch members 28 and 46 when the solenoid 60 is energized and opens the clutch-inlet valve 55. This provides for smooth clutch engagement and gradual load pick-up if there is relative motion at the time between the clutch members. More particularly, it provides for smooth clutch engagement when the machine is first started. The pressure quickly exhausts back through the wide open exhaust valve 58 when the solenoid 60 is de-energized.

A spring-loaded check valve 132 (in the valve housing 130) is instantly seated by the influence of its spring 133 and the air pressure flowing through the pipe 131 to the valve housing 130, as indicated by the direction arrows. This closes the large port in the by-pass check-valve housing 130, thereby checking the flow of pressure in volume from the air manifold 53 to the clutch cylinder 44, when the clutch-inlet valve 55 is opened. Hence, a too rapid engagement of the clutch PC is avoided, and this prevents strain or jerking on the drive belts 22 and 29, other parts of the power transmission and the motors.

The air pressure, however, is gradually fed from the chamber of the by-pass check valve 130 through a small by-pass port 134 to the clutch cylinder 44 for slowly moving its piston 45 to the left, thereby effecting a steady and gradual engagement of the relatively rotating clutch members 28 and 46. A needle valve 135 is manually adjustable to restrict the by-pass 134, leading around the large port closed by the check valve 132, thus providing a means for regulating the time required in completing the engagement of the clutch. The needle 135 is screwed in or out to reduce or increase the air flow through the by-pass 134 until the period of clutch engagement is smooth when the slow motor 32 is picking up its load in starting the oscillating action of the washer drum 7.

The function of this added by-pass check valve 130, and its check valve head 132 seating with and in the direction of the air flow in the pipe 131, is similar, therefore, to one of the functions of the pneumatic device EI. It is remembered that the by-pass needle valve 94, 95 (Figure 3) provided there for a gradual opening of the interlock or supplementary intake valve 66, 64 so that the charge of air is graduated in its flow to the earlier mentioned air line 51 leading to the clutch cylinder 44. Consequently, both forms of pneumatic-clutch controls (Figures 3 and 4) afford a gradual and smooth clutch engagement and afford means for readily adjusting the action of the clutch PC to the load and operating conditions.

Having now described two examples (Figures 3 and 4) of control means for effecting gradual clutch engagement, it may be preferred to bring together into one pneumatic system the advantages of both. It has been explained how the chamber 69 in the interlock device EI, gradually exhausting its trapped air pressure, acts to graduate the opening of the interlock or second inlet valve 66 from its seat 64, and is thus instrumental in effecting smooth engagement of the pneumatic clutch PC. But that was a function of the automatic-motor means when transferring from wash tumbling (first cycle) to the high-speed run (second cycle), and it is to be noted that when first starting the machine (after a period of non-use) there is no air pressure within the diaphragm chamber 69. Consequently there existed no medium (in the Figure 3 form) by which to initially effect the first clutch engagement in a gradual manner.

Accordingly, I may place a by-pass check valve in the clutch air line 51 to supplement the interlock valve 66. For example, the by-pass check valve 130 is included in the line 51, with its spring-loaded check valve 132 seating toward the clutch PC. If this combination is made, the adjustable by-pass valve 134, 135 is then regulated to effect a graduated flow of air pressure to the clutch cylinder 44. This arrangement interferes in no way with the locking-out function of the interlock valve 66, 64 and supplements its other function of graduating the flow of air pressure from the air-distributing header 53 to the clutch cylinder. This third modified form is in effect noted as being shown in the drawings, inasmuch as the variation explained simply amounts to connecting the air pipe 131 (Figure 4) with the clutch exhaust-and-interlock device EI (Figure 3). Hence, by adapting a by-pass check valve to the air tube 151, a slow engagement of the clutch PC is attained at all times.

Now as to the door lock control means shown in Figure 4, it will be seen that a new air pipe 137 is used which includes the same by-pass check valve 75, as already explained. The same check valve 93 seats here with and in the direction of the exhaust flow of pressure from the door lock DL as in the first form, as indicated here (Figure 4) by the arrows on pipe 137. The bleeder needle 95 may require a finer adjustment in this second form of construction to delay the release action of the door-locking bolt 77, unless the air tank 76 is used. In any event, the door-lock diaphragm chamber 82 contains enough air to maintain the door-locking bolt 77 in locked registration with the slide rod 78 until the whirling drum 7 comes to safe rest. Consequently, when the master switch 100 leaves its dotted line position, and thereby cuts off the fast motor 19 and simultaneously de-energizes the door-lock solenoid 91, the air line 137 is instantly opened to atmosphere by the wide opening exhaust valve 88, but the venting of said air tube 137 is slow due to the adjusted position of the by-pass valve 94, 95.

Both forms of controls (Figures 3 and 4) for the door lock DL provide for a quick-locking action when the fast motor 19 starts the drum 7 on its extracting cycle and a delayed-release action when said drum is coasting to a stop. It is remembered, while extracting, that there is no washing liquid WL in the vat 6 to retard the whirling drum 7, that said drum has considerable inertia, and consequently requires time to coast to a stop. The importance, therefore, of the delayed-release action of the door lock DL is now understood, and the means therefore is set forth in two appropriate forms of combination.

*The automatic motor means and cabinet in combination shown in Figures 6, 7 and 8*

These views better illustrate how the several related problems of my invention are worked out so as to adapt one element to another, i. e., my automatic-motor means to a cabinet, and conversely the cabinet to the motor means. Not only the latter provision is made, but my new cabinet also accommodates the washing means per se, and in this way I have produced a compact automatic washer in one unit. A description of this new cabinet and motor means combination as a single unit will now be given, in order that this additional branch of my invention may be fully understood.

My specially constructed cabinet 2 is in the nature of a closed housing which provides a sealed-washing chamber of upright form in the front cabinet portion with the door 9 leading into said chamber. This chamber contains the washing and drying means as well as an underneath tank to catch the washing liquid dumped from the vat 6 and drum 7. The washing and drying means per se and other parts, unnecessary to a disclosure of this branch of the invention, are not shown herein. A motor compartment is at the rear of the upright sealed-washing chamber. This motor compartment may be left open at its rear end, and it has the side opening 3 enclosed by the cover 4, as heretofore mentioned.

This cabinet construction embodies the front, top, side, and bottom walls, together with a vertical rear wall 140, all integrally joined and welded together along their meeting edges to provide the hermetically-sealed front washing chamber containing the vat 6 and drum 7. This construction makes a rigid and unitary rectangular cabinet or housing 2, not only for the washing means and its liquid, but as a framework to carry the machine bearings; and also at the rear in which to mount the motor means and its automatic controls. The motor compartment at the rear can be formed either by extending the top and side walls of the cabinet rearwardly beyond the washing chamber vertical wall 140, or made by separate side and top plates set onto the front sealed chamber at the rear wall 140 of the cabinet. The wall 140 is in effect a vertical partition wall which separates the machine cabinet 2 into a front washing chamber and rear motor compartment.

The washing-liquid vat 6 preferably is the form shown in Figure 4 and extends, therefore, from end to end of the cabinet, thereby having its own ends closed or welded on the inner surface of the side walls of the unitary cabinet 2. In this unitary form, one end of the vat 6 opens through the cabinet-side wall, and such opening is capped over and sealed by an outside cap or cover 6a secured over the open end of said at by screws or other means. In this way, one end of the vat 6 is accessible in order that the rotatable drum 7 may be installed within the sealed-washing chamber after it has been integrally fabricated in a single piece.

In this new cabinet 2, the washing vat 6 and its drum 7 are carried in the upper portion of the sealed chamber. This provides an adequate underneath space for a tank 141 formed by the cross partition or plate of rectangular form. This cross partition also preferably has its four edges welded to the front and side walls, and to the rear wall 140 of the cabinet, and thus provides this sump tank 141 constituted by the walls of the sealed chamber itself.

A storage tank 142 for a washing liquid is mounted above the motor compartment and to the rear of the washing chamber containing the vat 6 and drum 7. The storage tank 142 is shown as being constructed separately of the cabinet walls, slipped in from the rear end of the cabinet and supported in any convenient manner, as by angle iron supports anchored to the inner surface of the vertical side walls of the cabinet. This storage tank is usually provided with a fill pipe 143. The washing liquid stored in the tank 142 is adapted to be fed into the washing vat 6 through an inlet pipe 144 (Figure 8) communicating through an inlet valve (not shown) into the vat 6. The use and control of these liquid lines 143 and 144, and others, are not shown in connection with my combination cabinet and motor means, but form subject matter of my copending application.

A motor platform or cross-beam 146 is mounted lengthwise between the vertical side walls of the cabinet within the motor compartment and centrally of its side opening 3. This support 146 may be constructed from a piece of channel iron and closed at its ends as shown for supporting it within the motor compartment of the cabinet. An end plug may be welded into each end of the channel member 146 to receive a pivot bolt 147. The two bolts 147 horizontally mount the beam 146 between the side walls of the cabinet 2. These bolts 147 are on the same axis and also parallel to the drum 7. The bolts or pivots 147 thus provide for a slight rocking or tilting motion of this cross-beam 146 adapted as a support for the motors and part of the belt-adjustment means.

The two motors 19 and 32 are placed under the storage tank 142, are mounted one above the other, and are carried on one end of the beam 146 as shown. This installation arrangement is carried out by employing a rectangular iron box 148 shown open at both ends thereof and within which the slow-reversible motor 32 is anchored and covered. This motor support 148 is in the form of a tubular frame and the fast motor 19 is bolted to the top side thereof. Thus the two motors are bolted on the spaced parallel sides of the box frame 148. This sets the fast motor 19 above the slow motor 32, covers the latter, and appropriately brings the two motor shafts 20 and 31 into parallel relation. Likewise, the dual-motor set has its several shafts disposed parallel to the driven shaft 8 of the washing machine by anchoring the tubular frame 148 to the cross-beam 146 in that position and with the outer end of the tubular frame jutting into the opening 3 of the cabinet side wall.

The two motors rest within the side opening 3 of the cabinet so as to bring the combination driving and driven pulley 21 in alignment with the pulley 23 on the machine shaft 8 for the single outside belt 22 which can be enclosed under a suitable cover. This arrangement places the clutch 28 and its driving belt 29 on the inside of the motor compartment for enclosing these moving parts. The foregoing arrangement supports the entire load of the motor assembly on the cross-beam support 146 in a balanced position within the side-wall opening 3.

A simple means of anchoring the twin-motor assembly in steady upright position is provided by an adjustable connection made between the tubular frame 148 and the side wall of the cabinet. This may consist of a boss or stud 149 anchored on the tubular frame 148, together with an eye-bolt 150 pivoted thereto. The eye-bolt 150 is freely movable through an ear 151 likewise anchored to the side wall of the cabinet. Spaced lock nuts are screwed on the eye-bolt 150 and jam each side of the ear 151. In this way the eye-bolt 150 ties the tubular frame 148, with its upright motor assembly, within the cabinet opening 3, and thus rigidly sets or anchors the twin-driving motors in operating position.

The method of supporting the motors in the cabinet compartment provides a simple means of installation and removal since my particular twin-motor set can first be assembled within and on its tubular frame 148 and thereafter slipped into the opening 3 and anchored on the beam 146. Furthermore, the adjustable-tie arrangement 150 provides for quickly setting the tension of the outside belt 22 and this is done by taking up or letting out on the eye-bolt 150. The slight rocking adjustment of the motor set toward or away from the driven shaft 8 is accommodated by the beam 146 on its support pivots 147. Not only that, but the box frame 148 protects the lower motor 32 when working on the upper motor 19. Particularly, the tubular frame 148 provides a flat rigid base for the upper motor 19 when shimming it if need be to adjust it slightly up or down to adjust the tension of the inside belt 29 without disturbing the lower motor.

The foregoing installation arrangement leaves adequate room within the motor compartment for another iron box 153 secured to the side wall of the cabinet. This box 153 houses the electro-pneumatic control apparatus comprising in part the solenoid-valve unit or units SV carried upright on one or more air manifolds 53, as previously explained. This arrangement affords a short air pipe connection (51 or 131 previously explained) from the clutch-control valve 54 to the pneumatic-clutch cylinder 44. The other air pipe (71 or 137) leads up from the door-control valve 73 and over to the tube coil 72 of the door lock DL.

In a full-automatic washer of this type, one or more solenoid-valve units SV may be employed in one or more banks or rows to control numerous liquid and other lines, such as the fill and inlet pipes 143 and 144, and others, not shown herein, as previously mentioned. There is shown (Figure 8) the one air-distributing manifold 53 since it alone is directly related to the present invention.

Finally, it will be appreciated that the power mechanism with its two-speed reverse drive, as well as the apparatus for washing, are carried in a single housing which steadies all bearings and avoids shifts between related driving parts occurring with separately installed apparatus placed on factory or laundry floors.

The general operation

A résumé of a complete washing operation, say through its three automatic cycles, will be brought into three statements below for a complete understanding of the general mode of use and operation of the machine. While the operator has the door 9 open, the switch 16 breaks the circuit 17, 18 through the solenoids 115, 118 and 91. Neither motor 19 nor 32 can start while the operator is removing finished work from the drum 7 or putting a soiled load in the machine for the first run.

When the door 9 and its switch 16 is closed for this wash-tumbling (first cycle) operation, the master switch 100 being set (solid line), the machine automatically starts. The electro-pneumatic control unit 91, 89 cannot send a charge of air pressure to the door lock DL and so the door 9 is not locked during this run, but the other solenoid-valve unit 60, 57 is actuated and causes the clutch PC to be engaged. The reversible-motor timer CT is now running or may be started, thus actuating the automatic-reversing main switch 33 for periodically reversing the slow motor 32, some four or five times per minute. This washing action comes to an end at a predetermined time, just before which the washing liquid WL is drained from the vat 6 to make ready for the automatic transfer of the mechanism to the extracting cycle, noted in next paragraph.

The master switch 100 is now set to its extracting (dotted line) position by the cycle timer CT or manually by the attendant, as the case may be. The pneumatic clutch PC now disengages because the solenoid 60 is de-energized (no current flowing through valve-relay wire 123) thereby cutting off the pressure in air line 56, 51 and instantly exhausting the air from clutch cylinder 44 out through the exhaust port 65 in the clutch exhaust-and-interlock device EI. The slow motor 32 is thus uncoupled from the power transmission-driving or belt line, and its reversing main switch 33 goes to neutral position. The fast motor 19 starts because the master switch 100 (dotted line) now sends current to the solenoid 118 which energizes solenoid 120 thereby closing the fast-motor main switch 24. Likewise, the master-switch 100 (dotted line) sends current to solenoid 91, whereupon a charge of air is sent through the air line 74, 71. This expands the diaphragms 83 and 70, locks the door 9 and switch 16 closed, and seats the interlock valve 66 to lock out the clutch while the fast motor 19 is whirling the extracting drum 7 in the liquid-free vat 6. A few minutes completes this extracting operation, and the mechanism now automatically transfers back to the oscillating drive, followed in next paragraph.

The master switch 100 now goes back to its original (solid line) position and the machine automatically starts dry tumbling the extracted work (third cycle) by oscillating the drum 7 in the liquid-free vat 6. When this dry-tumbling is completed, the cycle timer 103 may sound a signal (not shown) to indicate that the machine has completed its run. The door 9 is now opened, and the door switch bottom 16a is used as a manual control for inching the washing drum 7 into unloading position, or the drum 7 can be turned by hand, and the work is removed.

The invention is presented in principle and several exemplary forms to fill the need felt for an automatic-power washer which is rugged in construction, reliable and safe in operation. Various modifications may occur to those skilled in the art, without departing from the principles of this invention. No limitation is intended, therefore, by the phraseology of the foregoing description or the illustrated examples of construction outlined in the accompanying drawings.

What is claimed is:

1. A washing machine comprising, in combination, a cabinet including a washing chamber at the front and a motor-means compartment at the rear thereof, a rotatable drum mounted in the washing chamber, a cross-beam mounted in the rear compartment at the lower portion thereof, axially-arranged pivots at each end of the cross-beam securing the latter within the cabinet, a tubular frame mounted upon the cross-beam, a drive motor mounted within the tubular frame, a drive motor mounted upon the tubular frame, the axes of the drum and motors as well as the cross-beam all disposed in parallel relation, a drive transmission-and-clutch means within the compartment and operatively connecting the two motors, a pulley and belt drive from the motor upon the tubular frame running to the drum, and an adjustable-tying means between the tubular frame and cabinet to secure said frame in rigid position within the compartment and adjust the last-named pulley and belt drive in relation to the drum.

2. A washing machine comprising, in combination, a cabinet including a front-washing chamber and a rear motor-means compartment, a rotatable drum mounted in the washing chamber, a rockable cross-beam mounted in the rear compartment at the lower portion thereof, axially-arranged pivots at each end of the cross-beam securing the latter within the cabinet, a tubular frame mounted upon the cross-beam, a motor carried inside the tubular frame and covered thereby and having its drive shaft with a pulley fixed thereon disposed beyond the end of said tubular frame on the inside of the compartment, a second motor carried on top of the tubular frame above the first motor, the axes of the drum and cross-beam as well as the tubular frame and both motors all disposed in parallel relation with each other, a driving-belt means on the outside of the compartment and operatively connecting the second motor with the drum, a screw adjustment-and-anchorage means tying the tubular frame to the cabinet, a power transmission inside the compartment operatively connecting the two motors, a clutch included in the transmission to uncouple the first-named motor from the second, the driving-belt means and the power transmission applying its torque at right angles to the axes aforesaid, and control means to stop and start the motors and control the engagement of the clutch.

3. A washing machine comprising, in combination, a cabinet divided into a front sealed-washing chamber and a rear-open motor compartment, a vat within the washing chamber and a storage tank forming a cover over the motor compartment, a drum rotatable within the vat, a cross-beam mounted within the compartment on an axis parallel to the drum, the compartment having an opening through its side in alignment with the cross-support, a horizontal tubular frame anchored on the cross-support and placed within the compartment but having its outer end jutting into the opening through the cabinet wall, a fast one-direction motor mounted upon the tubular frame and belt connected with the drum, a screw-anchorage means between the tubular frame and cabinet, a slow-reversible motor mounted within and covered by the tubular frame, a power transmission and clutch within the compartment and operatively connecting the two motors; and control means mounted within the compartment to cut off the fast motor, but engage the clutch and cut on the slow-reversible motor, and conversely cut on the fast motor and disengage the clutch.

4. An automatic-washing machine comprising, in combination, a cabinet means providing a washing chamber and a motor compartment at the rear thereof, a drum rotatably mounted within the washing chamber, a fast electric motor in the compartment and belt connected with the drum to whirl the same, a slow electric motor in the compartment and power transmission connecting the shafts of the two motors, a pneumatic clutch on the shaft of the fast motor, the axes of the drum and motors all arranged in parallel relation; an electro-pneumatic control means mounted on the cabinet wall within the compartment and operative to simultaneously engage the clutch, energize the slow motor, and de-energize the fast motor; a platform carrying the two motors extending across the compartment and supported at its ends within the cabinet and means for adjusting the platform in relation to the cabinet for varying the tension on the belt connected with the drum.

5. An automatic-washing machine comprising, in combination, a cabinet having a washing chamber and motor-means compartment, a washing drum rotatably mounted within the washing chamber, a door on the cabinet opening into the washing chamber, a horizontal shaft mounted on the cabinet and to which the door is fixed and said shaft extending to the side of the cabinet, a locking means mounted on the side of the cabinet and operatively connected with the shaft, electric-motor means carried within the compartment and having reversible-slow armature and one-direction fast armature shafts, the motor-means shafts and axis of the washing drum all disposed in parallel relation to each other within the cabinet, a power-transmission drive operatively connecting the motor means with the drum and including a clutch connecting one armature shaft with the other; and a control means inside the compartment, having a connection with the door lock and with the clutch adapted first to engage the clutch and oscillate the drum from the reversible-slow armature shaft driving through the idle one-direction fast armature shaft, thereafter disengaging the clutch and acting on the door lock to lock the door closed, and cutting on the one-direction fast motor to whirl the drum while the door is locked.

6. An automatic-washing machine comprising, in combination, a washing chamber and motor-means compartment formed in a unified cabinet, a washing drum rotatably mounted within the washing chamber, a door on the cabinet opening into the washing chamber, a horizontal shaft mounted on the cabinet and to which the door is fixed and said shaft extending to each side of the cabinet, a pneumatic-locking means mounted on one side of the cabinet, a switch disposed on the other side of the cabinet, means operatively connecting the shaft with the door lock and with the switch, whereby closing of the door also closes the switch, electric-motor means carried within the compartment and having reversible-slow armature and one-direction fast armature shafts, the motor-means shafts and axis of the washing drum all disposed in parallel relation within the cabinet, a power-transmission drive operatively connecting the motor means with the drum and including a pneumatic clutch connecting one armature shaft with the other; and an electro-pneumatic control means inside the compartment, having an air connection with the door lock and with the pneumatic clutch adapted first to engage the clutch and oscillate the drum from the reversible-slow armature shaft driving through the idle one-direction fast armature shaft, thereafter disengaging the clutch and sending air pressure to the door lock to lock the door closed, and starting the one-direction fast motor to whirl the drum while the door is locked closed and while the switch is locked closed, and an electrical circuit for controlling the motors and including the switch aforesaid for cutting out both motors when the door is open.

7. An automatic-washing machine or the like comprising, in combination, a washing-liquid vat with a washing drum mounted therein, a fast motor and power transmission means operatively connecting it with the washing drum to whirl the latter, a reversible motor and power transmission operatively connecting it with the fast motor, a clutch carried on the shaft of the fast motor and comprising a part of the power transmission operatively connecting the two motors; and control means, for each motor and the clutch, adapted to energize the reversible motor and engage the clutch, and to cut off said reversible motor and disengage the clutch and simultaneously energize the fast motor.

8. An automatic-washing machine or the like comprising, in combination, a washing-liquid vat with a washing drum mounted therein, a fast motor and power transmission means operatively connecting it with the washing drum to whirl the latter, a reversible motor and power transmission operatively connecting it with the fast motor to oscillate the washing drum, a clutch carried on the shaft of the fast motor and comprising a part of the power transmission operatively connecting the two motors, the axes of the washing drum and motors and clutch all disposed in parallel relation; and control means, for each motor and the clutch, adapted to energize the reversible motor and engage the clutch, and to cut off said reversible motor and disengage the clutch and energize the fast motor.

9. An automatic-washing machine or the like comprising, in combination, a housing and a washing vat with a washing drum mounted therein, a door on the housing affording access to the washing drum, a pneumatic lock for the door, a fast electric motor and power transmission means operatively connecting it with the washing drum, a reversible electric motor and power transmission operatively connecting it with the fast motor, a pneumatic clutch carried on the shaft of the fast motor and comprising a part of the power transmission operatively connecting the two motors; and electro-pneumatic control means, for the pneumatic door lock and for each motor and for the pneumatic clutch, adapted to energize the reversible motor and engage the clutch to oscillate the washing drum, and to cut off said reversible motor and disengage the clutch and lock the door lock and energize the fast motor to whirl said drum.

10. An automatic-washing machine or the like comprising, in combination, a liquid vat with a washing drum rotatably mounted therein, a door opening to the washing drum, a pneumatic lock for the door, a fast motor and power transmission means operatively connecting it with the washing drum, a reversible motor and power transmission operatively connecting it with the fast motor, a pneumatic clutch carried on the shaft of the fast motor and comprising a part of the power transmission operatively connecting the two motors; and electro-pneumatic control means, for the door lock and for each motor and for the clutch, adapted to keep the door lock unlocked while energizing the reversible motor and engaging the clutch for oscillating the washing drum, and to cut off said reversible motor and disengage the clutch and lock the door lock while energizing the fast motor to whirl the washing drum.

11. An automatic-washing machine or the like comprising, in combination, a vat with a washing drum mounted therein, a door opening to the washing drum, a pneumatic lock for the door, a switch operated by the door, a fast motor and power transmission means operatively connecting it with the washing drum, a reversible motor and power transmission operatively connecting it with the fast motor, a pneumatic clutch carried on the shaft of the fast motor and comprising a part of the power transmission operatively connecting the two motors; and electro-pneumatic control means in circuit with the switch and for controlling each motor and the clutch, adapted to energize the reversible motor and engage the clutch to oscillate the washing drum, and to cut off said reversible motor and disengage the clutch and lock the door lock and also lock the switch closed while energizing the fast motor to whirl the washing drum.

12. An automatic-washing machine or the like comprising, in combination, a vat with a washing drum mounted therein, a door opening to the washing drum, a pneumatic lock for the door, a switch operated by the door, a fast motor and power transmission means operatively connecting it with the washing drum, a reversible motor and power transmission operatively connecting it with the fast motor, a pneumatic clutch carried on the shaft of the fast motor and comprising a part of the power transmission operatively connecting the two motors; and electro-pneumatic control means in circuit with the switch and for controlling each motor and the clutch, adapted to energize the reversible motor and engage the clutch to oscillate the washing drum without locking the door lock, and to cut off said reversible motor and disengage the clutch and energize the fast motor for whirling the washing drum and for locking said door lock and said switch in closed position during said whirling.

13. A machine for automatic washing operations or the like, comprising in combination, a receptacle carried on an axis and operable to agitate the work therein, a set of motors each having an armature shaft and the axes thereof placed parallel to the receptacle, one motor having a double-end high-speed one-direction rotating shaft with one of its ends belt-connected with the receptacle to drive the latter for extracting purposes, a clutch having a pulley mounted on the other end of the shaft of the high-speed motor, a belt connection from the clutch and pulley to the shaft of the other motor which has a single-drive end operating at low speed to drive the receptacle slowly through the high-speed motor shaft, an electrical circuit and switch control for each motor; and means governed by the electrical circuit and switch control to engage the clutch and energize the single-drive end motor, and to disengage the clutch, cut off that motor, and energize the double-end motor.

14. A machine for automatic washing operations or the like, comprising in combination, a receptacle carried on an axis and operable to agitate the work therein, a reversible-slow motor and a one-direction fast motor having their armature shaft axes placed parallel to the receptacle, the fast motor having a double-end shaft with one of its ends belt-connected with the receptacle, a clutch having a pulley mounted on the other end of the fast motor shaft, a belt connection from the clutch and pulley to a pulley fixed on the shaft of the slow motor, an electrical circuit and switch control connected with each motor; and relay-operated means governed by the electrical circuit and switch control to engage the clutch and energize the reversible-slow motor, and to thereafter disengage the clutch, cut off said slow motor, and energize the fast motor.

15. A machine for automatic washing operations or the like, comprising in combination, a receptacle carried on an axis and operable to first agitate the work therein and second to extract the work, a set of drive motors mounted in close relation and each motor having its armature shaft placed parallel to the receptacle, one motor being a one-direction double-end shaft fast-drive motor with one of its ends belt-connected with the receptacle, a clutch having a pulley mounted on the other end of the shaft of the fast motor, a belt connection from the clutch and pulley to the shaft of the other motor which has thereon a reverse-driving slow pulley, the fast motor being mounted directly over the slow motor and set closely to the receptacle, an electrical circuit and switch control for each motor; and means governed by the electrical circuit and switch control to first engage the clutch and energize the slow motor which drives up to the fast motor and through the shaft thereof to the receptacle, and to thereafter disengage the clutch, cut off the slow motor, and energize the fast motor and thus directly drive the receptacle without rotating the slow motor.

16. An automatic washer and extractor drum with power means for rotating same, comprising in combination, a reversible-slow motor and a one-direction fast motor each having an armature shaft disposed parallel to the washer and to each other, a power transmission operatively connecting the adjacent ends of the two shafts, a pneumatic clutch mounted on the end of the fast motor and included as a part of the power transmission, a drive means connecting the end of one shaft with the combined washer and extractor, a piston and cylinder means carried with the clutch on one motor shaft end, electro-magnetic and pneumatic control means to admit and exhaust fluid pressure to and from the cylinder to engage and disengage the clutch, and an independent circuit and switch control for each motor and for the electro-pneumatic control means.

17. An automatic washer and extractor drum with power means for rotating same, comprising in combination; a reversible-slow motor and a one-direction fast motor, each having an armature shaft disposed parallel to the washer and to each other, the fast motor being mounted above and close to the slow motor providing for a close location of both motors near the combined washer and extractor, a vertically disposed power transmission operatively connecting the adjacent ends of the two motor shafts, a pneumatic clutch on one end of the fast motor shaft and included as a part of the power transmission, a drive means connecting the other end of one motor shaft with the washer, a piston and cylinder carried with the clutch on one motor shaft end, valve means to admit and exhaust fluid pressure from the cylinder, a solenoid for controlling the valve means, an independent circuit and switch control for each motor, and a relay circuit for the solenoid connected in with the circuit for the slow motor.

18. An automatic washer and extractor drum with power means for rotating same, comprising in combination, a reversible-slow motor and a one-direction fast motor placed in close parallel arrangement, the fast motor having a drive pulley on each end of its shaft, a belt drive from one pulley to the washer, a belt transmission operatively connecting the adjacent ends of the two motor shafts, a pneumatic clutch on the fast motor shaft and included as a part of the belt transmission, a piston and cylinder carried with the clutch and rotating with said fast motor shaft, an air pipe connected axially at the end of the cylinder and having a stuffing box connection, valve means to control the flow of fluid pressure to and from the cylinder, a solenoid to actuate the valve means, an independent circuit and switch control for each motor, and a relay circuit connected in with the circuit and switch control of the slow motor and with the solenoid.

19. An automatic washer and extractor drum with power means for rotating same, and having a door, comprising in combination, a reversible-slow motor and a one-direction double-end fast motor each having an armature shaft disposed parallel to the washer and to each other, a belt drive operatively connecting one end of the fast motor with the washer, a belt transmission operatively connecting the adjacent ends of the two motor shafts, a pneumatic clutch on the fast motor shaft end and included as a part of the belt transmission, a piston and cylinder carried with the clutch and rotating with the fast motor shaft end, an air pipe connected axially with the end of the cylinder, solenoid-valve means included in the air pipe to admit and exhaust fluid pressure from the cylinder, a lock for the door, a pneumatic device to actuate the lock, a solenoid-valve means to control the flow of fluid pressure to the pneumatic device, electrical circuits and switch control means for each motor and for each solenoid-valve means, and a switch on the door and said switch being included in series with the circuits for both motors and in series with the one solenoid-valve means which controls the door lock.

20. An automatic washer and extractor drum with power means for rotating same, and having a door, comprising in combination, a lock on the door, a safety switch operated by the door, means operated and held by the lock for locking the safety switch closed when the door is closed, a reversible-slow motor and a one-direction fast motor, each motor having an armature shaft disposed parallel to the washer and to each other, and the two motors placed in close operating proximity to the washer, a belt transmission operatively connecting the adjacent ends of the two shafts, the fast motor having its armature shaft formed as a double-end drive, a pneumatic clutch on one end of the fast motor shaft and included as a part of the belt transmission, a belt drive means connecting the other end of the fast motor shaft with the washer, a piston and cylinder carried with the clutch, electro-pneumatic control means to admit fluid pressure to the cylinder to engage the clutch for the slow motor drive of the washer, electro-pneumatic control means to actuate the lock and thus fix the door and safety switch in closed position; and circuit and switch controls for each motor including the aforesaid safety switch in series therewith, and for each electro-pneumatic control means, whereby the door and safety switch are both locked closed when the clutch is disengaged for the fast motor drive of the washer.

21. An automatic-washing machine or the like comprising, in combination, a washing drum, a reversible-slow motor and a one-direction fast motor for alternately oscillating and whirling the drum, the fast motor placed adjacent the drum and having its armature shaft operatively connected with said drum, the slow motor placed adjacent the fast motor, a clutch and driving transmission operatively connecting the shaft of the slow motor with the fast motor, a piston and cylinder means carried by and rotating with the clutch, an air pressure supply to the cylinder, a solenoid-valve means for controlling the admission of air to the cylinder, and an electrical circuit and switching controls to each motor and the solenoid-valve means, whereby the fast motor is first cut off and the slow motor is energized and the solenoid-valve means initiates engagement of the clutch for oscillating the drum through the idle shaft of the fast motor, and thereafter the clutch is disengaged as the slow motor cuts off and the fast motor is energized to whirl the drum.

22. An automatic-washing machine or the like comprising, in combination, a washing drum carried on a shaft with a large pulley fixed thereon, a one-direction fast motor placed adjacent the drum and having a double-end armature drive shaft disposed parallel to the drum shaft, a small pulley fixed on one end of the fast motor shaft, a belt on the large and small pulleys to drive the drum from the fast motor shaft, a clutch and large pulley on the other end of the fast motor shaft, a reversible slow motor placed adjacent the fast motor, a small pulley fixed on the shaft of the slow motor in line with the clutch and its large pulley on the fast motor shaft, a belt on the small pulley driving said clutch and its large pulley, a piston and cylinder means carried by and rotating with the clutch, an air pressure supply connected with the cylinder, a solenoid valve means for controlling the flow of air pressure to the cylinder; and an electrical circuit and switching controls connected with each motor and with the solenoid valve means, whereby the fast motor is first cut off and the slow motor energized and the solenoid valve means initiates engagement of the clutch to oscillate the drum at slow speed through the fast motor acting as a speed reducing countershaft, and thereafter the clutch automatically disengages as the slow motor cuts off and the fast motor is energized to whirl the drum at high speed.

23. An automatic-washing machine comprising, in combination, a housing having a receptacle for tumbling and extracting its work in consecutive steps, a door on the housing opening to the receptacle, a safety switch operated by the door, a lock to fix the door closed and to lock the switch closed; a fast motor having a double-end armature shaft, a clutch mounted on one end of said fast motor shaft, a slow motor having a reverse acting armature shaft; a speed reducing transmission operatively connecting the slow motor with the clutch, and similarly a speed reducing transmission operatively connecting the fast motor with the receptacle; a separate power circuit including a motor switch connected with each motor, the switch for the slow motor being a relay-operated reversing switch; a first relay circuit connecting in series therewith the safety switch operated by the door, a pair of relay switches in series with the first relay circuit, and one relay switch provided for each motor switch aforesaid, a reversing timer switch for controlling the operation of the relay operated reversing switch, a second relay circuit and actuating means governed thereby for controlling the engagement of the clutch, and a third relay circuit and actuating means governed thereby for controlling the operation of the door lock.

24. An automatic-washing machine comprising, in combination, a housing containing a receptacle for tumbling and extracting its work in consecutive steps, a door on the housing opening to the receptacle, a safety switch operated by the door, a lock to fix the door and switch closed; a fast motor having a double-end armature shaft, a clutch mounted on one end of said fast motor shaft, a slow motor having a reverse acting armature shaft; a speed reducing transmission operatively connecting the slow motor with the clutch, and similarly a speed-reducing transmission operatively connecting the fast motor with the receptacle; a separate power circuit including a motor switch connected with each motor, the switch for the slow motor being a relay operated reversing switch; a first relay circuit connecting in series therewith the safety switch operated by the door, a pair of relay switches in series with the first relay circuit and one relay switch provided for each motor switch aforesaid, a reversing timer switch for controlling the operation of the relay operated reversing switch, a second relay circuit and actuating means governed thereby for controlling the engagement of the clutch, and a third relay circuit and actuating means governed thereby for controlling the operation of the door lock.

25. An automatic-washing machine comprising, in combination, a housing containing a receptacle for tumbling and extracting its work in consecutive steps, a door on the housing opening to the receptacle, a safety switch operated by the door, a pneumatic lock to fix the door and switch in closed position, a solenoid valve control and air line connected with the pneumatic lock, a fast motor having a double-end armature shaft, a pneumatic clutch mounted on one end of the fast motor shaft, a solenoid valve control and air line connected with the pneumatic clutch, a clutch interlock valve included in the last named air line, a slow motor having a reverse acting armature shaft; a speed reducing transmission operatively connecting the slow motor with the pneumatic clutch, and similarly a speed reducing transmission operatively connecting the other end of the fast motor shaft with the receptacle; a separate power circuit including a motor switch connected with each motor, the switch for the slow motor being a relay-operated reversing switch; a first relay circuit connected in series with the safety switch operated by the door, a pair of relay switches in series with said first relay circuit and one relay switch provided for controlling each motor switch aforesaid, a reversing timer switch for controlling the operation of the relay operated reversing switch, a second relay circuit connected in series with the solenoid valve control for the pneumatic lock for controlling the operation of said lock and also for controlling the aforesaid clutch interlock valve, and a third relay circuit connecting the solenoid valve control for the pneumatic clutch with the power circuit.

26. An automatic-washing machine comprising, in combination, a housing containing a receptacle for tumbling and extracting its work in consecutive steps, a door on the housing opening to the receptacle, a safety switch operated by the door, a pneumatic lock to fix the door and switch in closed position, a solenoid valve control and air line connected with the pneumatic lock, a by-pass check valve in the air line to admit a full flow of air to the pneumatic lock but retard the exhaust therefrom, a fast motor having a double-end armature shaft, a pneumatic clutch mounted on one end of the fast motor shaft, a solenoid valve control and air line connected with the pneumatic clutch, a clutch interlock valve included in the last named air line, a pneumatic means to actuate the clutch interlock valve and supplied with pressure from the air line connected with the pneumatic lock, a slow motor having a reverse acting armature shaft; a speed reducing transmission operatively connecting the slow motor with the pneumatic clutch, and similarly a speed reducing transmission operatively connecting the other end of the fast motor shaft with the receptacle; a separate power circuit including a motor switch connected with each motor, the switch for the slow motor being a relay-operated reversing switch; a first relay circuit connected in series with the safety switch operated by the door, a pair of relay switches in series with said first relay circuit and one relay switch provided for controlling each motor switch aforesaid, a reversing timer switch for controlling the operation of the relay operated reversing switch, a second relay circuit connected in series with the solenoid valve control for the pneumatic lock for controlling the operation of said lock and also for controlling the aforesaid clutch interlock valve, and a third relay circuit connecting the solenoid valve control for the pneumatic clutch with the power circuit.

27. An automatic-washing machine comprising, in combination, a housing containing a receptacle for tumbling and extracting its work in consecutive steps, a door on the housing opening to the receptacle, a safety switch operated by the door, a pneumatic lock to fix the door and switch in closed position; a solenoid valve control and air line connected with the pneumatic lock, a pressure accumulator tank in this air line, and a by-pass check valve in this air line to delay the release of the pneumatic lock; a fast motor having a double-end armature shaft, a pneumatic clutch mounted on one end of said fast motor shaft, a solenoid valve control and air line connected with the pneumatic clutch, a clutch interlock valve included in the last named air line, a diaphragm device to actuate the clutch interlock valve, the air line aforesaid of the pneumatic lock being connected with the diaphragm device, an air manifold on which are mounted the two solenoid valve controls, a slow motor having a reverse acting armature shaft; a speed reducing transmission operatively connecting the slow motor with the pneumatic clutch, and similarly a speed reducing transmission operatively connecting the fast motor with the receptacle; a separate power circuit including a motor switch connected with each motor, the switch for the slow motor being a relay operated reversing switch; a first relay circuit connected in series with the safety switch operated by the door, a pair of relay switches in series with said first relay circuit and one relay switch provided for controlling each motor switch aforesaid, a reversing timer switch for controlling the operation of the relay operated reversing switch, a second relay circuit connected in series with the solenoid valve control for the pneumatic lock for controlling the operation of said lock and also for controlling the aforesaid clutch interlock valve, and a third relay circuit connecting the power circuit with the solenoid valve control for the pneumatic clutch.

28. An automatic-washing machine comprising, in combination, a washing drum within a housing, motor means for slowly oscillating the drum and thereafter whirling the drum, an electric circuit and switch control means for the motor means, a door on the housing, a lock for the door, means keeping the lock released so the door is not locked while the drum is oscillating, means for locking the door at the beginning of the whirling of the drum, means for starting the release of the lock when the circuit cuts off the motor means at the end of the whirling operation, and means for completing the release of the lock when the whirling drum coasts to a stop.

29. An automatic-washing machine comprising, in combination, a washing drum within a housing, motor means connected for slowly oscillating the drum and thereafter whirling the drum, an electric circuit and switch control means for the motor means, a door on the housing, a lock for the door, pneumatic means for actuating the lock, a valve and means for opening it to admit air pressure to the pneumatic means for setting the lock and fixing the door closed while the drum is whirling, means for closing the valve when the motor means is cut off from its circuit at the end of the whirling operation, and a by-pass valve having an adjustable bleeder exhaust connected with the pneumatic means to maintain pressure in the pneumatic means until the whirling drum coasts to a stop.

30. An automatic-washing machine comprising, in combination, a washing drum within a housing, motor means, a pneumatic clutch to couple the motor means to the drum to oscillate and whirl it in cycles, a door on the housing, a pneumatic lock for the door, a safety switch operated by the door, an air manifold, a clutch-control valve and air line in communication with the manifold and connected with the pneumatic clutch, a lock-control valve and air line in communication with the manifold and connected with the pneumatic door lock, a solenoid for opening each valve, an interlock valve in the air line connected with the clutch, a pneumatic device to close the interlock valve, an air line interconnected between the pneumatic device and the air line leading to the door lock, a by-pass check valve in the air line leading to the door lock adapted to rapidly pass the air to said door lock but retard the exhaust therefrom; an electric circuit and switch control to first energize the motor means and solenoid for opening the clutch-control valve to engage the pneumatic clutch, whereby the drum is oscillated, and thereafter closes the clutch-control valve, energizes the other solenoid to open the lock-control valve to actuate the lock which fixes the door and safety switch in closed position, sets the interlock valve in closed position, whereby the drum is whirled, and thereafter the electric circuit cuts off the motor means and allows the drum to coast to a stop, the by-pass check valve retards the release of the door lock and also the release of the interlock valve until the drum comes to rest, and an electric control circuit for the motor means including the safety switch in series therewith.

31. An automatic-washer comprising, in combination, a washing drum, motor means connected to operate the drum, a clutch on the motor means, a pneumatic device to engage the clutch, a solenoid valve as a first inlet adapted to quickly open and start a flow of air pressure through an air line to the pneumatic device, an interlock valve in the air line as a second inlet and also adapted to open to allow said flow of air pressure to continue to the pneumatic device, diaphragm means to slowly open the second inlet and slowly feed the air pressure to the pneumatic device, means to apply air pressure to the diaphragm means to subsequently shut the second inlet; and an electric circuit and switch controls for the motor means and the solenoid valve.

32. A washing machine or the like comprising, in combination, a drum within a housing, a fast motor operatively connected with the drum to whirl it, a pneumatic clutch mounted on the fast motor, a reversible slow motor operatively connected with the clutch to oscillate the drum through the de-energized fast motor, an air pipe connected with the pneumatic clutch, a clutch solenoid valve to control the flow of pressure through the pipe, a by-pass check valve in the air pipe to gradually feed the air to the pneumatic clutch to effect smooth engagement thereof and quick disengagement, a door on the housing affording access to the drum, a lock for the door, a diaphragm device to operate the lock, an air pipe connected with the diaphragm device, a lock solenoid valve to control the flow of pressure to the diaphragm device, a by-pass check valve in the last named air line to quickly pass a full charge of air pressure to the diaphragm device to instantly lock the door, said check valve having an adjustable bleeder exhaust port to slowly vent the pressure and delay the release action of the lock, an electric circuit and switch controls connected with the motors and solenoids for first energizing the slow motor and the clutch solenoid valve, and thereafter energize the fast motor and the lock solenoid valve.

33. A washing machine or the like comprising, in combination, a housing containing a washing drum for holding the work to be washed and extracted, a door on the housing, a pneumatically-actuated lock for the door, a motor means including a reversing-drive shaft and a one-direction drive shaft, a clutch on one of the shafts adapted to couple both shafts for joint operation and uncouple the shafts for independent operation, a power transmission operatively connecting the motor means with the washing drum, a pneumatic actuator carried with the clutch on its shaft to engage and disengage the clutch, an air-pressure manifold, a pair of control valves each of which has an intake and exhaust port mounted on and in communication with the manifold, a solenoid for actuating each control valve; an air tube connecting one valve with the pneumatically-actuated door lock, a check valve in the air tube adapted to open and admit a full charge of air pressure to flow from the manifold to quickly actuate the lock and thus lock the door, said check valve adapted to close and stop the exhaust of air pressure from the air tube, and a by-pass bleeder valve in the air tube to slowly permit said air to exhaust and delay the release action of said lock; an air line connecting the other valve with the pneumatic actuator for the clutch, a check valve in this air line adapted to close and retard the flow of a full charge of pressure to the pneumatic actuator, a by-pass bleeder valve in this air line to gradually feed the pressure to the pneumatic actuator thus regulating the engagement of the clutch, said check valve adapted to open and admit of a full and quick exhaust air flow from the pneumatic actuator to permit quick disengagement of the clutch; and electric circuit and switch control means for the motor means and the solenoids.

34. A power mechanism comprising, in combination, a one-direction fast motor having a double-end armature shaft, a driving means mounted on one end of the shaft adapted as a power take-off to drive any machine, a clutch and driven means mounted on the other end of the shaft, a reversible motor having a slow driving shaft a transmission connecting the slow driving shaft with the clutch and driven means, a piston and cylinder means for controlling the clutch and carried on the shaft of the fast motor, and means for admitting a charge of air pressure to the cylinder to engage the clutch.

35. A power mechanism comprising, in combination, a one-direction fast motor having a double-end armature shaft adapted as a power take-off, a driving pulley mounted on one end of the shaft, a clutch and driven pulley mounted on the other end of the shaft, a reversible motor having a slow driving pulley, a belt connecting the slow driving pulley with the clutch and driven pulley, a piston and cylinder means for controlling the clutch and carried on the shaft of the fast motor, and means for gradually admitting air pressure to the cylinder which slowly moves the piston to smoothly engage the clutch.

36. A power mechanism comprising, in combination, a one-direction fast motor having a double-end armature shaft, a driving pulley mounted on one end of the shaft adapted as a power take-off, a clutch and driven pulley mounted on the other end of the shaft, a reversible motor having a slow driving pulley, a belt connecting the slow driving pulley with the clutch and driven pulley, a piston and cylinder means for controlling the clutch and carried on the shaft of the fast motor, an air pipe connected with the cylinder, two inlet valves and two exhaust valves in the air pipe, a solenoid for opening one inlet valve and thus allowing pressure to flow to the second inlet valve, pressure controlled means resisting the opening of the second inlet valve but gradually decreasing its hold thereon which slowly opens said second valve to graduate the flow of pressure to cylinder, a power circuit and relay-operated switch connected with each motor, and a relay circuit and switch means including a reversible-timer switch to control the operation of the power circuits and the solenoid.

37. A power mechanism comprising, in combination, a one-direction fast motor having a double-end drive shaft, one end of which is adapted as a drive for any suitable purpose, on the other end of the shaft, a slow motor having a reversible slow driving shaft, a power transmission connecting the reversible slow driving shaft with the clutch, a power circuit relay-operated switch connected with the fast motor, a relay-operated reversing switch connected with the slow motor, a relay circuit including a relay switch to control the action of the relay-operated power switch for the fast motor, a relay circuit and master-relay switch including a reversing-timer switch for controlling the action of the reversing power switch for the slow motor; said master-relay switch having two positions, one for controlling the fast motor, and the other for the slow motor, and a safety cut-out switch in series with relay switch and the master relay switch, whereby both motors are interlocked against simultaneously energization by the master-relay switch and the safety cut-out switch.

38. A compactly arranged power mechanism, built into a single unit, comprising in combination, a support means in the form of a platform or beam, an axially disposed pivotal support at each end of the beam, a tubular frame secured on the beam, a reversible-slow motor mounted within the tubular frame and provided with a small driving pulley, a one-direction fast motor mounted upon the tubular frame and having a double-end armature shaft above the slow motor and in close proximity thereto, a clutch on one end of the fast motor shaft, a piston and cylinder carried with the clutch and its shaft and rotating therewith, a large pulley included in the clutch, a belt drive from the small driving pulley up to the large driven clutch pulley, a power take-off driven member on the other end of the fast motor shaft; a fluid-pressure line connected with the cylinder and valve control means in said line to control the action of said clutch, whereby the clutch is engaged when the slow motor is driving the power take-off member through the double-end armature shaft operating as a speed-reducing counter-shaft, and the clutch is disengaged with the slow motor at rest when the fast motor is driving.

39. A washing machine comprising, in combination, a housing, a washing drum in the housing, a door on the housing opening to the drum, a lock for the door; motor means operatively connected with the drum, and including a slow-reversing driving means and a fast one-direction driving means; and control means interconnecting the lock and motor means to maintain the lock in locked position only when the fast one-direction motor means is driving the drum.

40. A washing machine comprising, in combination, a housing, a washing drum in the housing, a door on the housing opening to the drum, a lock for the door; motor means operatively connected with the drum, and including a slow-reversing driving means, and a fast one-direction driving means; control means interconnecting the lock and motor means to maintain the lock in locked position only when the fast one-direction motor means is driving the drum; and a safety control device operated by said door and interconnected with said motor means to cut off said slow-reversing driving means upon opening of the door.

ERNEST DAVIS.

CERTIFICATE OF CORRECTION.

Patent No. 2,056,833.                                          October 6, 1936.

ERNEST DAVIS.

It is hereby certified that error appears in the printed specification of the above numbered patent requiring correction as follows: Page 3, second column, line 61, for the word "shows" read "show; page 4, first column, line 15, for "roor" read door; page 5, second column, line 53, after "heretofore" strike out the comma; line 73, for "pneumatitic" read pneumatic; page 9, second column, line 62, after" closed" insert a comma; page 16, first column, line 28, claim 4, after "cabinet" insert a comma; line 52, claim 5, after "clutch" insert a comma; page 21, first column, lines 35 and 36, claim 35, strike out the words "adapted as a power take-off" and insert the same after "shaft" and before the comma in line 37, same claim; and second column, line 1, claim 37, before "on" insert the words a clutch; line 19, same claim, for "simultaneously" read simultaneous; and that the said Letters Patent should be read with these corrections therein that the same may conform to the record of the case in the Patent Office.

Signed and sealed this 31st day of August, A. D. 1937.

Leslie Frazer (Seal)                                          Acting Commissioner of Patents